(12) United States Patent
Akiyoshi et al.

(10) Patent No.: US 7,085,419 B2
(45) Date of Patent: Aug. 1, 2006

(54) METHOD AND APPARATUS FOR CODING AND DECODING IMAGE DATA

(75) Inventors: Kozo Akiyoshi, Tokyo (JP); Nobuo Akiyoshi, Tokyo (JP)

(73) Assignee: Monolith Co., LTD, Tokyo (JP)

( * ) Notice: Subject to any disclaimer, the term of this patent is extended or adjusted under 35 U.S.C. 154(b) by 752 days.

(21) Appl. No.: 10/144,804

(22) Filed: May 15, 2002

(65) Prior Publication Data
US 2003/0043909 A1 Mar. 6, 2003

(30) Foreign Application Priority Data
May 15, 2001 (JP) ............................... 2001-144829

(51) Int. Cl.
*G06K 9/36* (2006.01)

(52) U.S. Cl. ....................... 382/232; 382/233; 382/209

(58) Field of Classification Search ................ 382/232, 382/233, 291, 209, 266, 151, 195, 217, 218, 382/107; 358/1.14; 348/208.4, 155, 207.99; 717/144, 156; 235/462.11
See application file for complete search history.

(56) References Cited

U.S. PATENT DOCUMENTS

| | | | | |
|---|---|---|---|---|
| 5,157,732 A | * | 10/1992 | Ishii et al. ................... | 382/107 |
| 6,018,592 A | | 1/2000 | Shinagawa et al. ......... | 382/195 |
| 6,070,800 A | * | 6/2000 | Fujita et al. ........... | 235/462.11 |
| 6,137,910 A | | 10/2000 | Shinagawa et al. ......... | 382/195 |
| 6,144,405 A | * | 11/2000 | Toba ....................... | 348/208.4 |
| 6,320,977 B1 | * | 11/2001 | Tokura ....................... | 382/151 |

* cited by examiner

*Primary Examiner*—Anh Hong Do

(57) ABSTRACT

A matching processor detects correspondence information between key frames. A judging unit detects motion vectors from the correspondence information to determine variation of a field of view between the key frames. When variation of the field of view is sufficiently large, added information is generated related to the variation of the field of view. A stream generator generates a coded data stream by incorporating the added information. An intermediate image generator (for example, at a decoding side) detects the added information and trims edges of a generated intermediate image to account for the variation in the field of view, so that an unnatural invalidated region is cut out.

67 Claims, 26 Drawing Sheets

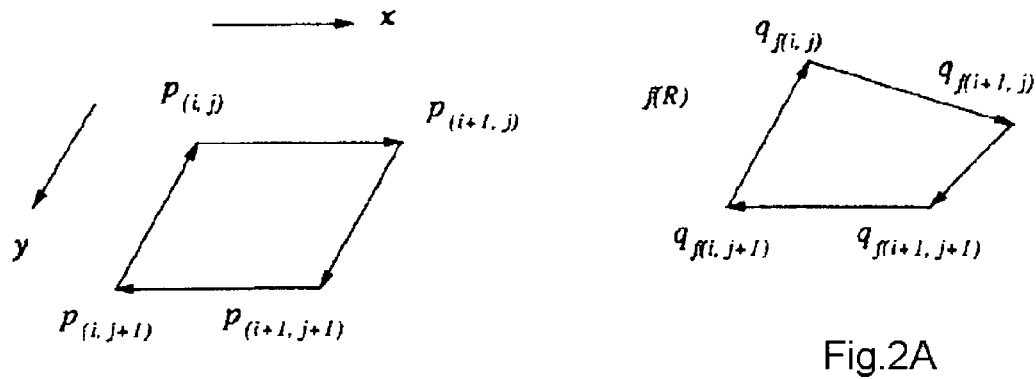
Fig.2R
Fig.2A
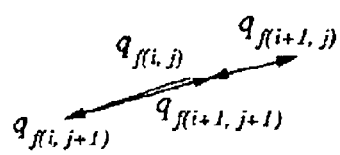
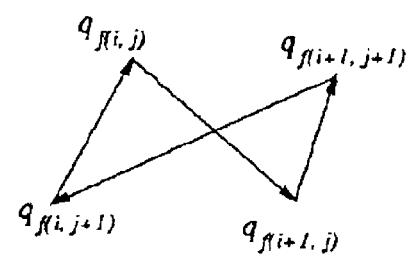
Fig.2E
Fig.2B
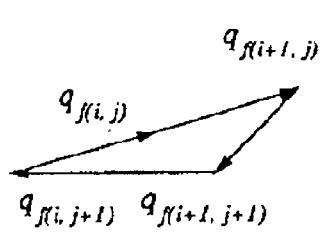
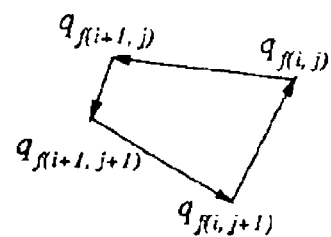
Fig.2D
Fig.2C p(m, s)

METHOD AND APPARATUS FOR CODING AND DECODING IMAGE DATA

BACKGROUND OF THE INVENTION

1. Field of the Invention

The present invention relates to an image data processing technology, and more particularly relates to a method and apparatus for coding and decoding image data containing a plurality of frames.

2. Description of the Related Art

Recently, image processing and compression methods such as those proposed by MPEG (Motion Picture Expert Group) have expanded to be used with transmission media such as network and broadcast rather than just storage media such as CDs. Generally speaking, the success of the digitization of broadcast materials has been caused at least in part by the availability of MPEG compression coding technology. In this way, a barrier that previously existed between broadcast and other types of communication has begun to disappear, leading to a diversification of service-providing businesses. Thus, we are facing a situation where it is hard to predict how the digital culture would evolve in this age of broadband.

Even in such a chaotic situation, it is clear that the direction of the compression technology of motion pictures will be to move to both higher compression rates and better image quality. It is a well-known fact that block distortion in MPEG compression is sometimes responsible for causing degraded image quality and preventing the compression rate from being improved.

SUMMARY OF THE INVENTION

The present invention has been made in view of the foregoing circumstances and an object thereof is to provide a coding and decoding technique for efficient compression of image data, and, in particular, to provide a new technology having a higher compression rate.

Image data processed in the present invention may be motion pictures or still pictures, in which three-dimensional objects are made into two dimensions, such as medical images. Namely, the image data may change along a time axis or a spatial axis. Stated in still another way, all types of images of arbitrary dimension can be processed if they can be considered as including frames. Hereinafter, the term "key frame" generally indicates a reference frame which is an object for matching or other processing while the term "intermediate frame" indicates a non-reference frame on which matching or other processing are not performed. In the present specification, for the purpose of simplicity, the term "frame" is both used as a unit of the image unless otherwise indicated, and as data itself constituting the unit, that is, as "frame data".

An embodiment according to the present invention relates to an image coding method. This method includes: detecting corresponding point data between key frames by image matching; and incorporating the corresponding point data and added information by which to invalidate at least part of a reproduction image, for example, a peripheral region thereof, which is to be generated at a decoding side based on the corresponding point data, so as to generate a coded data stream.

The "added information" may be an indication of a region to be invalidated, for example, a region where "the right edge of the image is cut out by an amount of 10 pixels in width in a strip shape", or the combination of the region and a method of processing the region. For example, besides the cutting-out processing, the invalidated region may be such that data for the region are forcibly replaced with certain image data. In this case, this "image data" which replaces the region may be thought of as the added information.

The image region excluding the above-described invalidated region (this image region being also referred to as a "remaining region") is useful in the sense that the remaining region has a shape of, for example, a rectangle, which can be appreciated, as it is, as an image or frame, and thus make subsequent processing simpler. As an example in which the remaining region is used as a frame, if a display system is of 800×600, then, for example, it may be desirable that the size of the key frame be in advance taken to be a bit larger than 800×600, e.g., 1000×800, so that the remaining region may be adjusted to the size of 800×600.

The invalidation or invalidated region becomes meaningful when, for example, a camera which photographed the key frames pans (namely, changes the viewing direction) or the camera zooms in and out (namely, magnification or reduction in the same radial direction). In these cases, there are pixels which do not correspond between the key frames, thus generally causing erroneous correspondence in the matching. This erroneous correspondence generally occurs mainly at the edges of the image. This is because points which are photographed in one of the two frames but are excluded from the field of view in the other key frame occur mainly at the edge. Thus, the region to be invalidated is speculated to be a strip-shaped region surrounding the edge of the image somewhat like a picture frame or a part thereof. This process can be said to be image trimming in the sense that the edge may be thrown away.

Alternatively, the corresponding point data may be incorporated into a coded data stream after data corresponding to a region to be invalidated are deleted. In the case of the above-described example, since "an amount of 10 pixels in width in the right edge of the image" does not need the corresponding point data therefor, this would be deleted. On decoding, the image region where the corresponding point data do not exist may be interpreted as being invalidated by a decoding side.

Another embodiment according to the present invention includes: detecting corresponding point data between key frames by image matching; and incorporating data of the key frames whose at least part of region was invalidated, and the detected corresponding point data, so as to generate a coded data stream. In this embodiment, the significance lies in the feature that the key frames themselves are processed.

Still another embodiment according to the present invention includes: detecting corresponding point data between key frames by image matching; and incorporating added information by which to invalidate at least part of region of a reproduction image which is to be generated at a decoding side based on the detected corresponding point data, into the corresponding point data, so as to generate a coded data stream. Thus, the corresponding point data contain, as a region to be invalidated, for example, information such as "an amount of 10 pixels in the right edge of the image." Since the corresponding point data are already present in the coded data stream, some convenience of transmission and so forth can be achieved by attaching or incorporating the added information into the corresponding point data. Moreover, in place of adding the added information, the corresponding point data may be generated in a state where data corresponding to the region to be invalidated are simply deleted as described above.

It is to be noted that the step of detecting the corresponding point data by image matching is not essential in any of the embodiments, and the corresponding point data may be prepared in advance or at any place, including coding and decoding sides or elsewhere.

Still another embodiment according to the present invention relates to an image decoding method. This method includes: acquiring a coded data stream of an image; and generating an intermediate frame based on corresponding point data between key frames included in the acquired coded data stream, wherein the intermediate frame is generated in a manner that at least part of region thereof is invalidated. The generating may be performed by extracting indication of a region to be invalidated from the coded data stream or may be performed by extracting image data which replaces data of the region to be invalidated from the coded data stream.

This decoding method may further include: judging the magnitude of variation of field of view of a camera which photographed the key frames based on the corresponding point data. Said invalidating may be executed only when it is judged that the variation of the field of view is substantially large. Though consideration of the camera's field of view may be realized at the coding side, it may also be realized at the decoding side.

Still another embodiment according to the present invention relates to an image coding method that includes: detecting corresponding point data between key frames by image matching, determining added information by which to invalidate at least a region of a reproduction image which is to be generated at a decoding side based on the corresponding point data, and generating a coded data stream incorporating the corresponding point data and added information. In a particular case, the added information may include co-ordinates of an invalidated region. Also, the added information may be calculated based on motion vectors determined from the corresponding point data.

It is to be noted that the base technology is not a requirement of the present invention. Further it is also possible to have replacement or substitution of the above-described structural components and elements of methods in part or whole as between method and apparatus or to add elements to either method or apparatus and also, the apparatuses and methods may be implemented by a computer program and saved on a recording medium or the like and are all effective as and encompassed by the present invention.

Moreover, this summary of the invention includes features that may not be necessary features such that an embodiment of the present invention may also be a subcombination of these described features.

BRIEF DESCRIPTION OF THE DRAWINGS

FIG. 1($b$) is an image obtained as a result of the application of an averaging filter to another human facial image.

FIG. 1($c$) is an image of a human face at $p^{(5,0)}$ obtained in a preferred embodiment in the base technology.

FIG. 1($d$) is another image of a human face at $p^{(5,0)}$ obtained in a preferred embodiment in the base technology.

FIG. 1($e$) is an image of a human face at $p^{(5,1)}$ obtained in a preferred embodiment in the base technology.

FIG. 1($f$) is another image of a human face at $p^{(5,1)}$ obtained in a preferred embodiment in the base technology.

FIG. 1($g$) is an image of a human face at $p^{(5,2)}$ obtained in a preferred embodiment in the base technology.

FIG. 1($h$) is another image of a human face at $p^{(5,2)}$ obtained in a preferred embodiment in the base technology.

FIG. 1($i$) is an image of a human face at $p^{(5,3)}$ obtained in a preferred embodiment in the base technology.

FIG. 1($j$) is another image of a human face at $p^{(5,3)}$ obtained in a preferred embodiment in the base technology.

FIG. 2(R) shows an original quadrilateral.
FIG. 2(A) shows an inherited quadrilateral.
FIG. 2(B) shows an inherited quadrilateral.
FIG. 2(C) shows an inherited quadrilateral.
FIG. 2(D) shows an inherited quadrilateral.
FIG. 2(E) shows an inherited quadrilateral.

FIG. 5($b$) is a diagram illustrating determination of whether or not the mapping for a certain point satisfies the bijectivity condition through the outer product computation.

FIG. 9 is a diagram showing correspondence between partial images of the m-th and (m−1)th levels of resolution.

DETAILED DESCRIPTION OF THE INVENTION

Figures 1A, 1B:
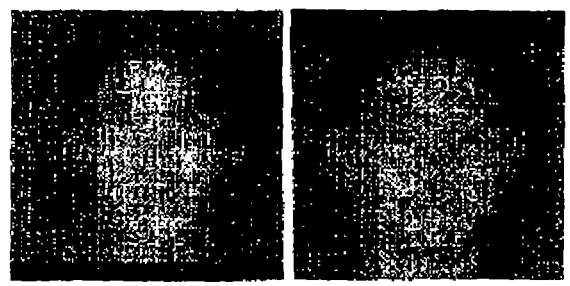
FIG. 1($a$) is an image obtained as a result of the application of an averaging filter to a human facial image.

The invention will now be described based on the preferred embodiments, which do not intend to limit the scope of the present invention, but exemplify the invention. All of the features and the combinations thereof described in the embodiment are not necessarily essential to the invention.

First, the multiresolutional critical point filter technology and the image matching processing using the technology, both of which will be utilized in the preferred embodiments, will be described in detail as "Base Technology". Namely, the following sections [1] and [2] (below) belong to the base technology, where section [1] describes elemental techniques and section [2] describes a processing procedure. These techniques are patented under Japanese Patent No. 2927350 and owned by the same assignee of the present invention. However, it is to be noted that the image matching techniques provided in the present embodiments are not limited to the same levels. In particular, in FIGS. 18 to 30, image data coding and decoding techniques, utilizing, in part, the base technology, will be described in more detail.

Base Technology

[1] Detailed Description of Elemental Techniques

[1.1] Introduction

Using a set of new multiresolutional filters called critical point filters, image matching is accurately computed. There is no need for any prior knowledge concerning the content of the images or objects in question. The matching of the images is computed at each resolution while proceeding through the resolution hierarchy. The resolution hierarchy proceeds from a coarse level to a fine level. Parameters necessary for the computation are set completely automatically by dynamical computation analogous to human visual systems. Thus, There is no need to manually specify the correspondence of points between the images.

The base technology can be applied to, for instance, completely automated morphing, object recognition, stereo photogrammetry, volume rendering, and smooth generation of motion images from a small number of frames. When applied to morphing, given images can be automatically transformed. When applied to volume rendering, intermediate images between cross sections can be accurately reconstructed, even when a distance between cross sections is rather large and the cross sections vary widely in shape.

[1.2] The Hierarchy of the Critical Point Filters

The multiresolutional filters according to the base technology preserve the intensity and location of each critical point included in the images while reducing the resolution. Initially, let the width of an image to be examined be N and the height of the image be M. For simplicity, assume that $N=M=2^n$ where n is a positive integer. An interval $[0, N] \subset R$ is denoted by I. A pixel of the image at position $(i, j)$ is denoted by $p^{(i,j)}$ where $i,j \in I$.

Here, a multiresolutional hierarchy is introduced. Hierarchized image groups are produced by a multiresolutional filter. The multiresolutional filter carries out a two dimensional search on an original image and detects critical points therefrom. The multiresolutinal filter then extracts the critical points from the original image to construct another image having a lower resolution. Here, the size of each of the respective images of the m-th level is denoted as $2^m \times 2^m$ ($0 \leq m \leq n$). A critical point filter constructs the following four new hierarchical images recursively, in the direction descending from n.

$$p_{(i,j)}^{(m,0)} = \min(\min(p_{(2i,2j)}^{(m+1,0)}, p_{(2i,2j+1)}^{(m+1,0)}), \min(p_{(2i+1,2j)}^{(m+1,0)}, p_{(2i+1,2j+1)}^{(m+1,0)})) \quad (1)$$

$$p_{(i,j)}^{(m,1)} = \max(\min(p_{(2i,2j)}^{(m+1,1)}, p_{(2i,2j+1)}^{(m+1,1)}), \min(p_{(2i+1,2j)}^{(m+1,1)}, p_{(2i+1,2j+1)}^{(m+1,1)}))$$

$$p_{(i,j)}^{(m,2)} = \min(\max(p_{(2i,2j)}^{(m+1,2)}, p_{(2i,2j+1)}^{(m+1,2)}), \max(p_{(2i+1,2j)}^{(m+1,2)}, p_{(2i+1,2j+1)}^{(m+1,2)}))$$

$$p_{(i,j)}^{(m,3)} = \max(\max(p_{(2i,2j)}^{(m+1,3)}, p_{(2i,2j+1)}^{(m+1,3)}), \max(p_{(2i+1,2j)}^{(m+1,3)}, p_{(2i+1,2j+1)}^{(m+1,3)}))$$

where we let $$p_{(i,j)}^{(n,0)} = p_{(i,j)}^{(n,1)} = p_{(i,j)}^{(n,2)} = p_{(i,j)}^{(n,3)} = p_{(i,j)} \quad (2)$$

The above four images are referred to as subimages hereinafter. When $\min_{x \leq t \leq x+1}$ and $\max_{x \leq t \leq x+1}$ are abbreviated to $\alpha$ and $\beta$, respectively, the subimages can be expressed as follows:

$$P^{(m,0)} = \alpha(x)\alpha(y)p^{(m+1,0)}$$

$$P^{(m,1)} = \alpha(x)\beta(y)p^{(m+1,1)}$$

$$P^{(m,2)} = \alpha(x)\alpha(y)p^{(m+1,2)}$$

$$P^{(m,2)} = \alpha(x)\beta(y)p^{(m+1,3)}$$

Namely, they can be considered analogous to the tensor products of $\alpha$ and $\beta$. The subimages correspond to the respective critical points. As is apparent from the above equations, the critical point filter detects a critical point of the original image for every block consisting of 2×2 pixels. In this detection, a point having a maximum pixel value and a point having a minimum pixel value are searched with respect to two directions, namely, vertical and horizontal directions, in each block. Although pixel intensity is used as a pixel value in this base technology, various other values relating to the image may be used. A pixel having the maximum pixel values for the two directions, one having minimum pixel values for the two directions, and one having a minimum pixel value for one direction and a maximum pixel value for the other direction are detected as a local maximum point, a local minimum point, and a saddle point, respectively.

By using the critical point filter, an image (1 pixel here) of a critical point detected inside each of the respective blocks serves to represent its block image (4 pixels here) in the next lower resolution level. Thus, the resolution of the image is reduced. From a singularity theoretical point of view, $\alpha(x) \alpha(y)$ preserves the local minimum point (minima point), $\beta(x) \beta(y)$ preserves the local maximum point (maxima point), $\alpha(x) \beta(y)$ and $\beta(x) \alpha(y)$ preserve the saddle points.

At the beginning, a critical point filtering process is applied separately to a source image and a destination image which are to be matching-computed. Thus, a series of image groups, namely, source hierarchical images and destination hierarchical images are generated. Four source hierarchical images and four destination hierarchical images are generated corresponding to the types of the critical points.

Thereafter, the source hierarchical images and the destination hierarchical images are matched in a series of resolution levels. First, the minima points are matched using $p^{(m,0)}$. Next, the first saddle points are matched using $p^{(m,1)}$ based on the previous matching result for the minima points. The second saddle points are matched using $p^{(m,2)}$. Finally, the maxima points are matched using $p^{(m,3)}$.

Figures 1C, 1D:
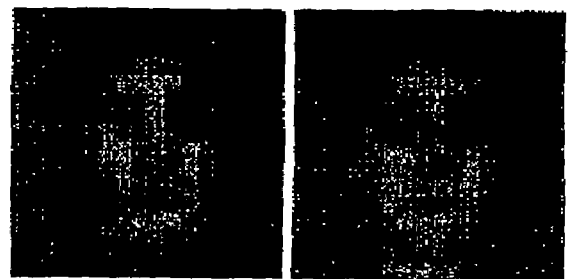
Figures 1E, 1F:
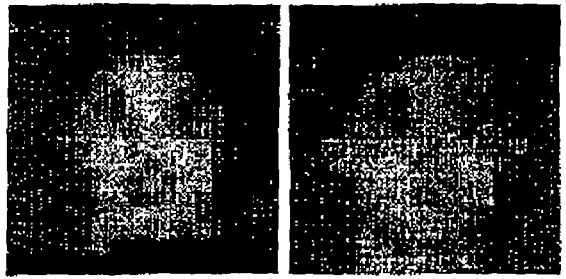
Figures 1G, 1H:
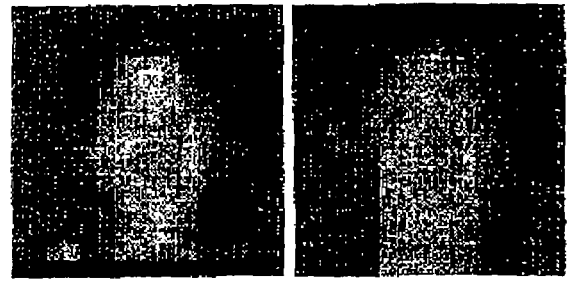
Figures 1I, 1J:
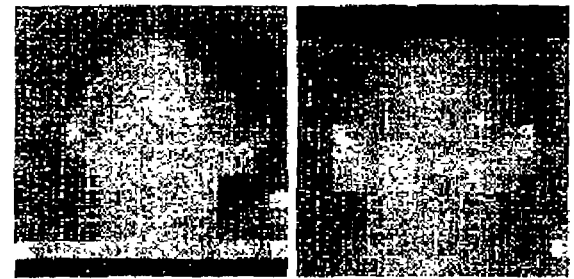

FIGS. 1c and 1d show the subimages $p^{(5,0)}$ of the images in FIGS. 1a and 1b, respectively. Similarly, FIGS. 1e and 1f show the subimages $p^{(5,1)}$, FIGS. 1g and 1h show the subimages $p^{(5,2)}$, and FIGS. 1i and 1j show the subimages $p^{(5,3)}$. Characteristic parts in the images can be easily matched using subimages. The eyes can be matched by $p^{(5,0)}$ since the eyes are the minima points of pixel intensity in a face. The mouths can be matched by $p^{(5,1)}$ since the mouths have low intensity in the horizontal direction. Vertical lines on both sides of the necks become clear by $p^{(5,2)}$. The ears and bright parts of the cheeks become clear by $p^{(5,3)}$ since these are the maxima points of pixel intensity.

As described above, the characteristics of an image can be extracted by the critical point filter. Thus, by comparing, for example, the characteristics of an image shot by a camera with the characteristics of several objects recorded in advance, an object shot by the camera can be identified.

[1.3] Computation of Mapping Between Images

Now, for matching images, a pixel of the source image at the location (i,j) is denoted by $p_{(i,j)}^{(n)}$ and that of the destination image at (k,l) is denoted by $q_{(k,l)}^{(n)}$ where i, j, k, l ∈ I. The energy of the mapping between the images (described later in more detail) is then defined. This energy is determined by the difference in the intensity of the pixel of the source image and its corresponding pixel of the destination image and the smoothness of the mapping. First, the mapping $f^{(m,0)}: p^{(m,0)} \rightarrow q^{(m,0)}$ between $p^{(m,0)}$ and $q^{(m,0)}$ with the minimum energy is computed. Based on $f^{(m,0)}$, the mapping $f^{(m,1)}$ between $p^{(m,1)}$ and $q^{(m,1)}$ with the minimum energy is computed. This process continues until $f^{(m,3)}$ between $p^{(m,3)}$ and $q^{(m,3)}$ is computed. Each $f^{(m,i)}$ (i=0,1,2, . . . ) is referred to as a submapping. The order of i will be rearranged as shown in the following equation (3) in computing $f^{(m,i)}$ for reasons to be described later.

$$f^{(m,i)}: p^{(m,\sigma(i))} \rightarrow q^{(m,\sigma(i))} \qquad (3)$$

where σ (i) ∈ {0,1,2,3}.

[1. 3. 1] Bijectivity

When the matching between a source image and a destination image is expressed by means of a mapping, that mapping shall satisfy the Bijectivity Conditions (BC) between the two images (note that a one-to-one surjective mapping is called a bijection). This is because the respective images should be connected satisfying both surjection and injection, and there is no conceptual supremacy existing between these images. It is to be noted that the mappings to be constructed here are the digital version of the bijection. In the base technology, a pixel is specified by a co-ordinate point.

The mapping of the source subimage (a subimage of a source image) to the destination subimage (a subimage of a destination image) is represented by $f^{(m,s)}: I/2^{n-m} \times I/2^{n-m} \rightarrow I/2^{n-m} \times I/2^{n-m}$ (s=0,1, . . . ), where $f_{(i,j)}^{(m,s)} = (k,l)$ means that $p_{(i,j)}^{(m,s)}$ of the source image is mapped to $q_{(k,l)}^{(m,s)}$ of the destination image. For simplicity, when f(i,j)=(k,l) holds, a pixel $q_{(k,l)}$ is denoted by $q_{f(i,j)}$.

When the data sets are discrete as image pixels (grid points) treated in the base technology, the definition of bijectivity is important. Here, the bijection will be defined in the following manner, where i, j, k and l are all integers. First, a square region R defined on the source image plane is considered $$p_{(i,j)}^{(m,s)} p_{(i+1,j)}^{(m,s)} p_{(i+1,j+1)}^{(m,s)} p_{(i,j+1)}^{(m,s)} \qquad (4)$$

where i =0, . . . , $2^m-1$, and j=0, . . . , $2^m-1$. The edges of R are directed as follows:

$$\overrightarrow{p_{(i,j)}^{(m,s)} p_{(i+1,j)}^{(m,s)}}, \overrightarrow{p_{(i+1,j)}^{(m,s)} p_{(i+1,j+1)}^{(m,s)}}, \overrightarrow{p_{(i+1,j+1)}^{(m,s)} p_{(i,j+1)}^{(m,s)}} \text{ and } \overrightarrow{p_{(i,j+1)}^{(m,s)} p_{(i,j)}^{(m,s)}} \qquad (5)$$

This square region R will be mapped by f to a quadrilateral on the destination image plane:

$$q_{f(i,j)}^{(m,s)} q_{f(i+1,j)}^{(m,s)} q_{f(i+1,j+1)}^{(m,s)} q_{f(i,j+1)}^{(m,s)} \qquad (6)$$

This mapping $f^{(m,s)}$ (R), that is, $$f^{(m,s)}(R) = f^{(m,s)}(p_{(i,j)}^{(m,s)} p_{(i+1,j)}^{(m,s)} p_{(i+1,j+1)}^{(m,s)} p_{(i,j+1)}^{(m,s)}) = q_{f(i,j)}^{(m,s)} q_{f(i+1,j)}^{(m,s)} q_{f(i+1,j+1)}^{(m,s)} q_{f(i,j+1)}^{(m,s)})$$

should satisfy the following bijectivity conditions (referred to as BC hereinafter):

1. The edges of the quadrilateral $f^{(m,s)}$ (R) should not intersect one another.
2. The orientation of the edges of $f^{(m,s)}$ (R) should be the same as that of R (clockwise in the case shown in FIG. 2, described below).
3. As a relaxed condition, a retraction mapping is allowed.

Without a certain type of a relaxed condition as in, for example, condition 3 above, there would be no mappings which completely satisfy the BC other than a trivial identity mapping. Here, the length of a single edge of $f^{(m,s)}$ (R) may be zero. Namely, $f^{(m,s)}$ (R) may be a triangle. However, $f^{(m,s)}$ (R) is not allowed to be a point or a line segment having area zero. Specifically speaking, if FIG. 2R is the original quadrilateral, FIGS. 2A and 2D satisfy the BC while FIGS. 2B, 2C and 2E do not satisfy the BC.

In actual implementation, the following condition may be further imposed to easily guarantee that the mapping is surjective. Namely, each pixel on the boundary of the source image is mapped to the pixel that occupies the same location at the destination image. In other words, f(i,j)=(i,j) (on the four lines of $i=0$, $i=2^m-1$, $j=0$, $j=2^m-1$). This condition will be hereinafter referred to as an additional condition.

[1. 3. 2] Energy of Mapping

[1. 3. 2. 1] Cost Related to the Pixel Intensity

The energy of the mapping f is defined. An objective here is to search a mapping whose energy becomes minimum. The energy is determined mainly by the difference in the intensity between the pixel of the source image and its corresponding pixel of the destination image. Namely, the energy $C_{(i,j)}^{(m,s)}$ of the mapping $f^{(m,s)}$ at $(i,j)$ is determined by the following equation (7).

$$C_{(i,j)}^{(m,s)} = |V(p_{(i,j)}^{(m,s)}) - V(q_{f(i,j)}^{(m,s)})|^2 \tag{7}$$

where $$V(p_{(i,j)}^{(m,s)}) \text{ and } V(q_{(i,j)}^{(m,s)})$$

are the intensity values of the pixels $p_{(i,j)}^{(m,s)}$ and $q_{f(i,j)}^{(m,s)}$, respectively. The total energy $C^{(m,s)}$ of f is a matching evaluation equation, and can be defined as the sum of $C^{(i,j)(m,s)}$ as shown in the following equation (8).

$$C_f^{(m,s)} = \sum_{i=0}^{i=2^m-1} \sum_{j=0}^{j=2^m-1} C_{(i,j)}^{(m,s)} \tag{8}$$

[1. 3. 2. 2] Cost Related to the Locations of the Pixel for Smooth Mapping

In order to obtain smooth mappings, another energy $D_f$ for the mapping is introduced. The energy $D_f$ is determined by the locations of $p_{(i,j)}^{(m,s)}$ and $q_{f(i,j)}^{(m,s)}$ ($i=0,1,\ldots,2^m-1$, $j=0,1,\ldots,2^m-1$), regardless of the intensity of the pixels. The energy $D_{(i,j)}^{(m,s)}$ of the mapping $f^{(m,s)}$ at a point $(i,j)$ is determined by the following equation (9).

$$D_{(i,j)}^{(m,s)} = \eta E_{0(i,j)}^{(m,s)} + E_{1(i,j)}^{(m,s)} \tag{9}$$

where the coefficient parameter $\eta$ which is equal to or greater than 0 is a real number. And we have $$E_{0(i,j)}^{(m,s)} = \|(i,j) - f^{(m,s)}(i,j)\|^2 \tag{10}$$

$$E_{1(i,j)}^{(m,s)} = \sum_{i'=i-1}^{i} \sum_{j'=j-1}^{j} \|(f^{(m,s)}(i,j) - (i-j)) - (f^{(m,s)}(i',j') - (i',j'))\|^2 / 4 \tag{11}$$

where $$\|(x,y)\| = \sqrt{x^2 + y^2}, \tag{12}$$

i' and j' are integers and $f(i',j')$ is defined to be zero for $i'<0$ and $j'<0$. $E_0$ is determined by the distance between $(i,j)$ and $f(i,j)$. $E_0$ prevents a pixel from being mapped to a pixel too far away from it. However, as explained below, $E_0$ can be replaced by another energy function. $E_1$ ensures the smoothness of the mapping. $E_1$ represents a distance between the displacement of $p(i,j)$ and the displacement of its neighboring points. Based on the above consideration, another evaluation equation for evaluating the matching, or the energy $D_f$ is determined by the following equation:

$$D_f^{(m,s)} = \sum_{i=0}^{i=2^m-1} \sum_{j=0}^{j=2^m-1} D_{(i,j)}^{(m,s)} \tag{13}$$

[1. 3. 2. 3] Total Energy of the Mapping

The total energy of the mapping, that is, a combined evaluation equation which relates to the combination of a plurality of evaluations, is defined as $\lambda C_f^{(m,s)} + D_f^{(m,s)}$, where $\lambda \geq 0$ is a real number. The goal is to detect a state in which the combined evaluation equation has an extreme value, namely, to find a mapping which gives the minimum energy expressed by the following:

$$\min_f \{\lambda C_f^{(m,s)} + D_f^{(m,s)}\} \tag{14}$$

Care must be exercised in that the mapping becomes an identity mapping if $\lambda=0$ and $\eta=0$ (i.e., $f^{(m,s)}(i,j)=(i,j)$ for all $i=0, 1, \ldots, 2^m-1$ and $j=0, 1, \ldots, 2^m-1$). As will be described later, the mapping can be gradually modified or transformed from an identity mapping since the case of $\lambda=0$ and $\eta=0$ is evaluated at the outset in the base technology. If the combined evaluation equation is defined as $C_f^{(m,s)} + \lambda D_f^{(m,s)}$ where the original position of $\lambda$ is changed as such, the equation with $\lambda=0$ and $\eta=0$ will be $C_f^{(m,s)}$ only. As a result thereof, pixels would randomly matched to each other only because their pixel intensities are close, thus making the mapping totally meaningless. Transforming the mapping based on such a meaningless mapping makes no sense. Thus, the coefficient parameter is so determined that the identity mapping is initially selected for the evaluation as the best mapping.

Similar to this base technology, differences in the pixel intensity and smoothness are considered in a technique called "optical flow" that is known in the art. However, the optical flow technique cannot be used for image transformation since the optical flow technique takes into account only the local movement of an object. However, global correspondence can also be detected by utilizing the critical point filter according to the base technology.

[1. 3. 3] Determining the Mapping with Multiresolution

A mapping $f_{min}$ which gives the minimum energy and satisfies the BC is searched by using the multiresolution hierarchy. The mapping between the source subimage and the destination subimage at each level of the resolution is computed. Starting from the top of the resolution hierarchy (i.e., the coarsest level), the mapping is determined at each resolution level, and where possible, mappings at other levels are considered. The number of candidate mappings at each level is restricted by using the mappings at an upper (i.e., coarser) level of the hierarchy. More specifically speaking, in the course of determining a mapping at a certain level, the mapping obtained at the coarser level by one is imposed as a sort of constraint condition.

We thus define a parent and child relationship between resolution levels. When the following equation (15) holds, $$(i', j') = \left(\left\lfloor \frac{i}{2} \right\rfloor, \left\lfloor \frac{i}{2} \right\rfloor\right), \quad (15)$$

where $\lfloor x \rfloor$ denotes the largest integer not exceeding x, $p_{(i',j')}^{(m-1,s)}$ and $q_{(i',j')}^{(m-1,s)}$ are respectively called the parents of $p_{(i,j)}^{(m,s)}$ and $q_{(i,j)}^{(m,s)}$. Conversely, $p_{(i,j)}^{(m,s)}$ and $q_{(i,j)}^{(m,s)}$ are the child of $p_{(i',j')}^{(m-1,s)}$ and the child of $q_{(i',j')}^{(m-1,s)}$, respectively. A function parent (i,j) is defined by the following equation (16):

$$\text{parent}(i, j) = \left(\left\lfloor \frac{i}{2} \right\rfloor, \left\lfloor \frac{i}{2} \right\rfloor\right) \quad (16)$$

Now, a mapping between $p_{(i,j)}^{(m,s)}$ and $q_{(k,l)}^{(m,s)}$ is determined by computing the energy and finding the minimum thereof. The value of $f^{(m,s)}$ (i,j)=(k,l) is determined as follows using f(m−1,s) (m=1,2, . . . ,n). First of all, a condition is imposed that $q_{(k,l)}^{(m,s)}$ should lie inside a quadrilateral defined by the following definitions (17) and (18). Then, the applicable mappings are narrowed down by selecting ones that are thought to be reasonable or natural among them satisfying the BC.

$$q_{g^{(m,s)}(i-1,j-1)}^{(m,s)} q_{g^{(m,s)}(i-1,j+1)}^{(m,s)} q_{g^{(m,s)}(i+1,j+1)}^{(m,s)} q_{g^{(m,s)}(i+1,j-1)}^{(m,s)} \quad (17)$$

where $$g^{(m,s)}(i, j) = f^{(m-1,s)}(\text{parent}(i, j)) + f^{(m-1,s)}(\text{parent}(i, j) = (1, 1)) \quad (18)$$

The quadrilateral defined above is hereinafter referred to as the inherited quadrilateral of $p_{(i,j)}^{(m,s)}$. The pixel minimizing the energy is sought and obtained inside the inherited quadrilateral.

Figure 3:
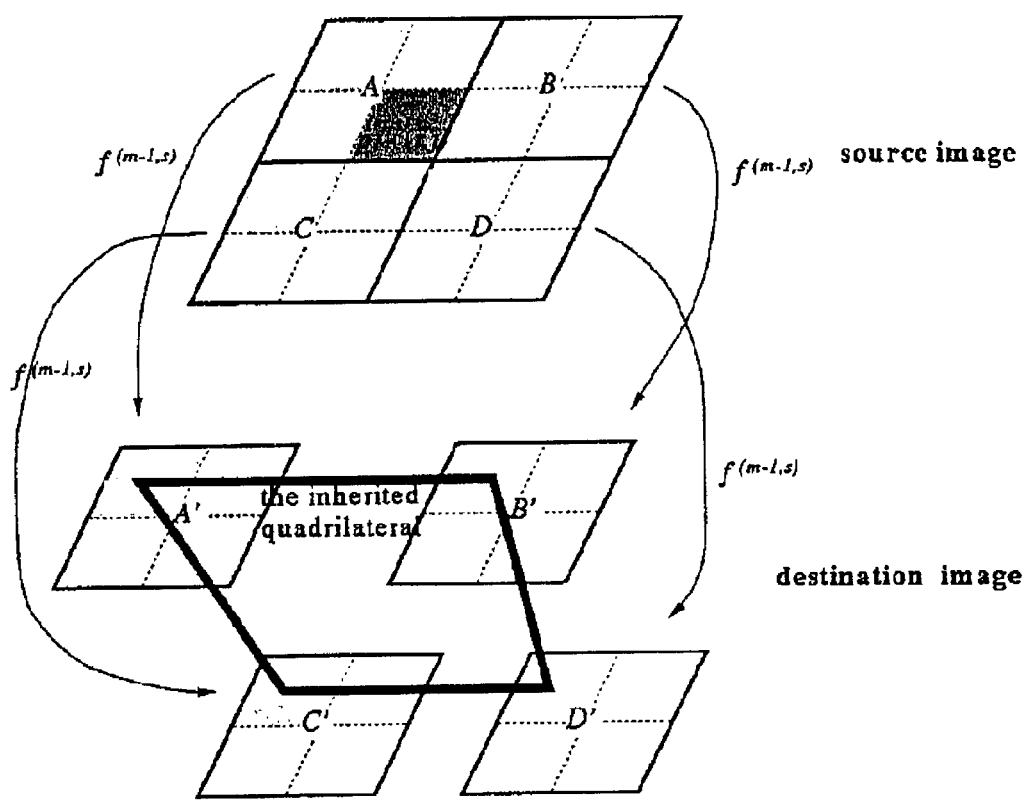
FIG. 3 is a diagram showing the relationship between a source image and a destination image and that between the m-th level and the (m−1)th level, using a quadrilateral.

FIG. 3 illustrates the above-described procedures. The pixels A, B, C and D of the source image are mapped to A', B', C' and D' of the destination image, respectively, at the (m−1)th level in the hierarchy. The pixel $p_{(i,j)}^{(m,s)}$ should be mapped to the pixel $q_{f^{(m)}(i,j)}^{(m,s)}$ which exists inside the inherited quadrilateral A'B'C'D'. Thereby, bridging from the mapping at the (m−1)th level to the mapping at the m-th level is achieved.

The energy $E_0$ defined above may now be replaced by the following equations (19) and (20):

$$E_{0_{(i,j)}} = \|f^{(m,0)}(i, j) - g^{(m)}(i, j)\|^2 \quad (19)$$

$$E_{0_{(i,j)}} = \|f^{(m,s)}(i, j) - f^{(m,s-1)}(i, j)\|^2, (1 \le i) \quad (20)$$

for computing the submapping $f^{(m,0)}$ and the submapping $f^{(m,s)}$ at the m-th level, respectively.

In this manner, a mapping which maintains a low energy of all the submappings is obtained. Using the equation (20) makes the submappings corresponding to the different critical points associated to each other within the same level in order that the subimages can have high similarity. The equation (19) represents the distance between $f^{(m,s)}$ (i,j) and the location where (i,j) should be mapped when regarded as a part of a pixel at the (m−1)the level.

When there is no pixel satisfying the BC inside the inherited quadrilateral A'B'C'D', the following steps are taken. First, pixels whose distance from the boundary of A'B'C'D' is L (at first, L=1) are examined. If a pixel whose energy is the minimum among them satisfies the BC, then this pixel will be selected as a value of $f^{(m,s)}$ (i,j). L is increased until such a pixel is found or L reaches its upper bound $L_{max}^{(m)}$. $L_{max}^{(m)}$ is fixed for each level m. If no pixel is found at all, the third condition of the BC is ignored temporarily and such mappings that caused the area of the transformed quadrilateral to become zero (a point or a line) will be permitted so as to determine $f^{(m,s)}$ (i, j). If such a pixel is still not found, then the first and the second conditions of the BC will be removed.

Multiresolution approximation is essential to determining the global correspondence of the images while preventing the mapping from being affected by small details of the images. Without the multiresolution approximation, it is impossible to detect a correspondence between pixels whose distances are large. In the case where the multiresolution approximation is not available, the size of an image will generally be limited to a very small size, and only tiny changes in the images can be handled. Moreover, imposing smoothness on the mapping usually makes it difficult to find the correspondence of such pixels. That is because the energy of the mapping from one pixel to another pixel which is far therefrom is high. On the other hand, the multiresolution approximation enables finding the approximate correspondence of such pixels. This is because the distance between the pixels is small at the upper (coarser) level of the hierarchy of the resolution.

[1. 4] Automatic Determination of the Optimal Parameter Values

One of the main deficiencies of the existing image matching techniques lies in the difficulty of parameter adjustment. In most cases, the parameter adjustment is performed manually and it is extremely difficult to select the optimal value. However, according to the base technology, the optimal parameter values can be obtained completely automatically.

The systems according to this base technology include two parameters, namely, λ and η, where λ and η represent the weight of the difference of the pixel intensity and the stiffness of the mapping, respectively. In order to automatically determine these parameters, the are initially set to 0. First, λ is gradually increased from λ=0 while η is fixed at 0. As λ becomes larger and the value of the combined evaluation equation (equation (14)) is minimized, the value of $C_f^{(m,s)}$ for each submapping generally becomes smaller. This basically means that the two images are matched better. However, if λ exceeds the optimal value, the following phenomena occur:

1. Pixels which should not be corresponded are erroneously corresponded only because their intensities are close.
2. As a result, correspondence between images becomes inaccurate, and the mapping becomes invalid.
3. As a result, $D_f^{(m,s)}$ in equation (14) tends to increase abruptly.
4. As a result, since the value of equation (14) tends to increase abruptly, $D_f^{(m,s)}$ changes in order to suppress the abrupt increase of $D_f^{(m,s)}$. As a result, $C_f^{(m,s)}$ increases.

Therefore, a threshold value at which $C_f^{(m,s)}$ turns to an increase from a decrease is detected while a state in which equation (14) takes the minimum value with $\lambda$ being increased is kept. Such $\lambda$ is determined as the optimal value at $\eta=0$. Next, the behavior of $C_f^{(m,s)}$ is examined while $\eta$ is increased gradually, and $\eta$ will be automatically determined by a method described later. $\lambda$ will then again be determined corresponding to such an automatically determined $\eta$.

The above-described method resembles the focusing mechanism of human visual systems. In the human visual systems, the images of the respective right eye and left eye are matched while moving one eye. When the objects are clearly recognized, the moving eye is fixed.

[1. 4. 1] Dynamic Determination of $\lambda$

Initially, $\lambda$ is increased from 0 at a certain interval, and a subimage is evaluated each time the value of $\lambda$ changes. As shown in equation (14), the total energy is defined by $$\lambda C_f^{(m,s)} + D_f^{(m,s)}. \quad D_{(i,j)}^{(m,s)}$$

in equation (9) represents the smoothness and theoretically becomes minimum when it is the identity mapping. $E_0$ and $E_1$ increase as the mapping is further distorted. Since $E_1$ is an integer, 1 is the smallest step of $D_f^{(m,s)}$. Thus, it is impossible to change the mapping to reduce the total energy unless a changed amount (reduction amount) of the current $\lambda C_{(i,j)}^{(m,s)}$ is equal to or greater than 1. Since $D_f^{(m,s)}$ increases by more than 1 accompanied by the change of the mapping, the total energy is not reduced unless $\lambda C_{(i,j)}^{(m,s)}$ is reduced by more than 1.

Under this condition, it is shown that $C_{(i,j)}^{(m,s)}$ decreases in normal cases as $\lambda$ increases. The histogram of $C_{(i,j)}^{(m,s)}$ is denoted as $h(l)$, where $h(l)$ is the number of pixels whose energy $C_{(i,j)}^{(m,s)}$ is $l^2$. In order that $\lambda l^2 \geq 1$ for example, the case of $l^2 = 1/\lambda$ is considered. When $\lambda$ varies from $\lambda_1$ to $\lambda_2$, a number of pixels (denoted A) expressed by the following equation (21):

$$A = \sum_{l=\left\lceil\frac{1}{\lambda_2}\right\rceil}^{\left\lfloor\frac{1}{\lambda_1}\right\rfloor} h(l) \cong \int_{l=\frac{1}{\lambda_2}}^{\frac{1}{\lambda_1}} h(l)\,dl = -\int_{\lambda_2}^{\lambda_1} h(l) \frac{1}{\lambda^{3/2}}\,d\lambda = \int_{\lambda_1}^{\lambda_2} \frac{h(l)}{\lambda^{3/2}}\,d\lambda \quad (21)$$

changes to a more stable state having the energy shown in equation (22):

$$C_f^{(m,s)} - l^2 = C_f^{(m,s)} - \frac{1}{\lambda}. \quad (22)$$

Here, it is assumed that the energy of these pixels is approximated to be zero. This means that the value of $C_{(i,j)}^{(m,s)}$ changes by:

$$\partial C_f^{(m,s)} = -\frac{A}{\lambda} \quad (23)$$

As a result, equation (24) holds.

$$\frac{\partial C_f^{(m,s)}}{\partial \lambda} = -\frac{h(l)}{\lambda^{5/2}} \quad (24)$$

Since $h(l)>0$, $C_f^{(m,s)}$ decreases in the normal case. However, when $\lambda$ exceeds the optimal value, the above phenomenon, that is, an increase in $C_f^{(m,s)}$ occurs. The optimal value of $\lambda$ is determined by detecting this phenomenon.

When $$h(l) = Hl^k = \frac{H}{\lambda^{k/2}} \quad (25)$$

is assumed, where both H(H>0) and k are constants, the equation (26) holds:

$$\frac{\partial C_f^{(m,s)}}{\partial \lambda} = -\frac{H}{\lambda^{5/2+k/2}} \quad (26)$$

Then, if $k \neq -3$, the following equation (27) holds:

$$C_f^{(m,s)} = C + \frac{H}{(3/2+k/2)\lambda^{3/2+k/2}} \quad (27)$$

The equation (27) is a general equation of $C_f^{(m,s)}$ where C is a constant).

When detecting the optimal value of $\lambda$, the number of pixels violating the BC may be examined for safety. In the course of determining a mapping for each pixel, the probability of violating the BC is assumed as a value $p_0$ here. In this case, since $$\frac{\partial A}{\partial \lambda} = \frac{h(l)}{\lambda^{3/2}} \quad (28)$$

holds, the number of pixels violating the BC increases at a rate of:

$$B_0 = \frac{h(l)p_0}{\lambda^{3/2}} \quad (29)$$

Thus, $$\frac{B_0 \lambda^{3/2}}{p_0 h(l)} = 1 \quad (30)$$

is a constant. If it is assumed that $h(l)=Hl^k$, the following equation (31), for example, $$B_0 \lambda^{3/2+k/2} = p_0 H \tag{31}$$

becomes a constant. However, when λ exceeds the optimal value, the above value of equation (31) increases abruptly. By detecting this phenomenon, i.e. whether or not the value of $B_0 \lambda^{3/2+k/2}/2^m$ exceeds an abnormal value $B_0^{thres}$, the optimal value of λ can be determined. Similarly, whether or not the value of $B_1 \lambda^{3/2+k/2}/2^m$ exceeds an abnormal value $B_1^{thres}$ can be used to check for an increasing rate $B_1$ of pixels violating the third condition of the BC. The reason why the factor $2^m$ is introduced here will be described at a later stage. This system is not sensitive to the two threshold values $B_0^{thres}$ and $B_1^{thres}$. The two threshold values and $B_0^{thres}$ and $B_1^{thres}$ can be used to detect excessive distortion of the mapping which may not be detected through observation of the energy $C_f^{(m,s)}$.

In the experimentation, when λ exceeded 0.1 the computation of $f^{(m,s)}$ was stopped and the computation of $f^{(m,s+1)}$ was started. That is because the computation of submappings is affected by a difference of only 3 out of 255 levels in pixel intensity when λ>0.1 and it is then difficult to obtain a correct result.

[1. 4. 2] Histogram h(l)

The examination of $C_f^{(m,s)}$ does not depend on the histogram h(l), however, the examination of the BC and its third condition may be affected by h(l). When (λ, $C_f^{(m,s)}$) is actually plotted, k is usually close to 1. In the experiment, k=1 is used, that is, $B_0 \lambda^2$ and $B_1 \lambda^2$ are examined. If the true value of k is less than 1, $B_0 \lambda^2$ and $B_1 \lambda^2$ are not constants and increase gradually by a factor of $\lambda^{(1-k)/2}$. If h(l) is a constant, the factor is, for example, $\lambda^{1/2}$. However, such a difference can be absorbed by setting the threshold $B_0^{thres}$ appropriately.

Let us model the source image by a circular object, with its center at$(x_0,y_0)$ and its radius r, given by:

$$p(i, j) = \begin{cases} \frac{255}{r} c\left(\sqrt{(i-x_0)^2 + (j-y_0)^2}\right) \ldots \left(\sqrt{(i-x_0)^2 + (j-y_0)^2} \leq r\right) \\ 0 \ldots \text{(otherwise)} \end{cases} \tag{32}$$

and the destination image given by:

$$q(i, j) = \begin{cases} \frac{255}{r} c\left(\sqrt{(i-x_1)^2 + (j-y_1)^2}\right) \ldots \left(\sqrt{(i-x_1)^2 + (j-y_1)^2} \leq r\right) \\ 0 \ldots \text{(otherwise)} \end{cases} \tag{33}$$

with its center at$(x_1,y_1)$ and radius r. In the above, let c(x) have the form of $c(x)=x^k$. When the centers $(x_0,y_0)$ and $(x_1,y_1)$ are sufficiently far from each other, the histogram h(l) is then in the form:

$$h(l) \propto r l^k \, (k \neq 0) \tag{34}$$

When k=1, the images represent objects with clear boundaries embedded in the background. These objects become darker toward their centers and brighter toward their boundaries. When k=−1, the images represent objects with vague boundaries. These objects are brightest at their centers, and become darker toward their boundaries. Without much loss of generality, it suffices to state that objects in images are generally between these two types of objects. Thus, choosing k such that −1≦k≦1 can cover most cases and the equation (27) is generally a decreasing function for this range.

As can be observed from the above equation (34), attention must be directed to the fact that r is influenced by the resolution of the image, that is, r is proportional to $2^m$. This is the reason for the factor $2^m$ being introduced in the above section [1.4.1].

[1. 4. 3] Dynamic Determination of η

The parameter η can also be automatically determined in a similar manner. Initially, η is set to zero, and the final mapping $f^{(n)}$ and the energy $C_f^{(n)}$ at the finest resolution are computed. Then, after η is increased by a certain value Δη, the final mapping $f^{(n)}$ and the energy $C_f^{(n)}$ at the finest resolution are again computed. This process is repeated until the optimal value of η is obtained. η represents the stiffness of the mapping because it is a weight of the following equation (35):

$$E_{0(i,j)}^{(m,s)} = \|f^{(m,s)}(i, j) - f^{(m,s-1)}(i, j)\|^2 \tag{35}$$

Figure 4:
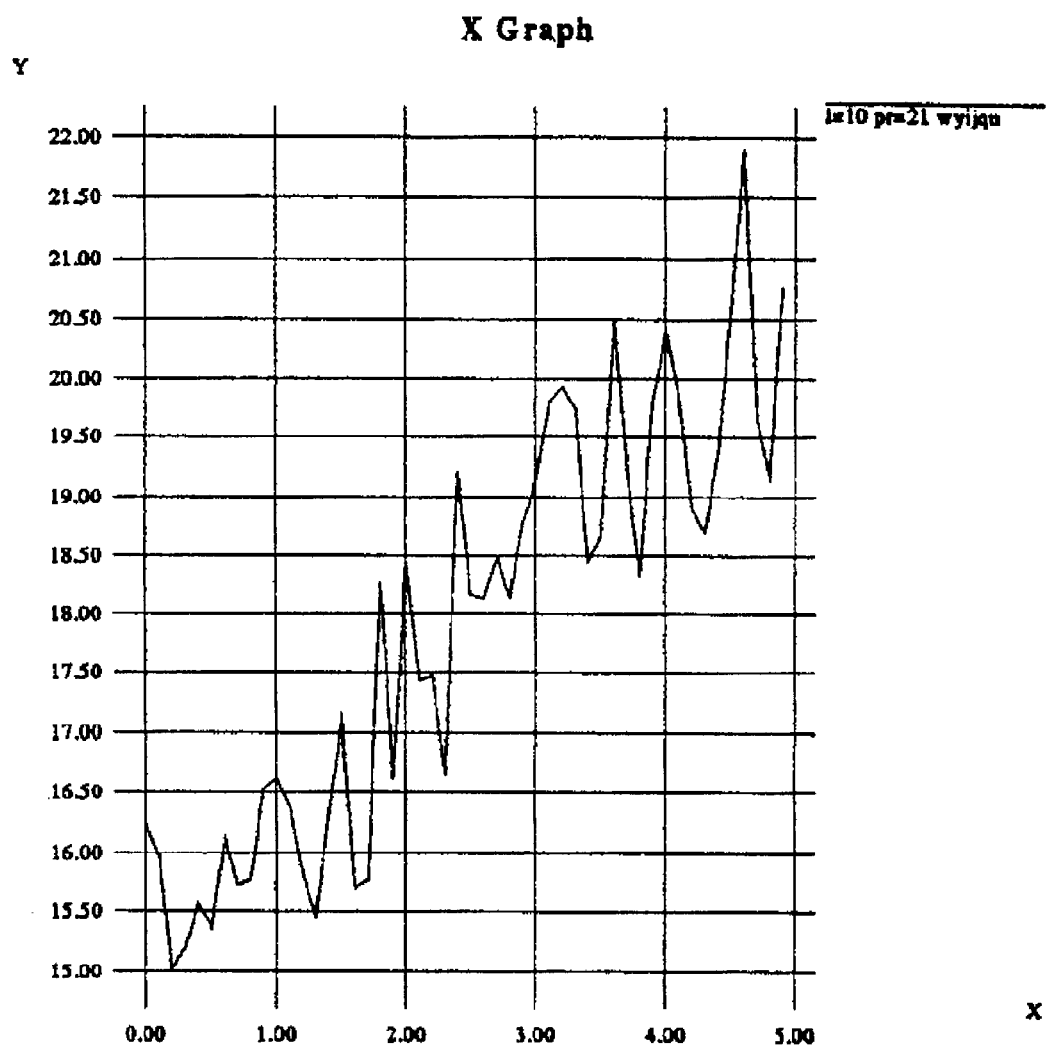
FIG. 4 shows the relationship between a parameters $\eta$ (represented by x-axis) and energy $C_f$ (represented by y-axis)

If η is zero, $D_f^{(n)}$ is determined irrespective of the previous submapping, and the present submapping may be elastically deformed and become too distorted. On the other hand, if η is a very large value, $D_f^{(n)}$ is almost completely determined by the immediately previous submapping. The submappings are then very stiff, and the pixels are mapped to almost the same locations. The resulting mapping is therefore the identity mapping. When the value of η increases from 0, $C_f^{(n)}$ gradually decreases as will be described later. However, when the value of η exceeds the optimal value, the energy starts increasing as shown in FIG. 4. In FIG. 4, the x-axis represents η, and y-axis represents $C_f$.

The optimum value of η which minimizes $C_f^{(n)}$ can be obtained in this manner. However, since various elements affect this computation as compared to the case of λ, $C_f^{(n)}$ changes while slightly fluctuating. This difference is caused because a submapping is re-computed once in the case of λ whenever an input changes slightly, whereas all the submappings must be re-computed in the case of η. Thus, whether the obtained value of $C_f^{(n)}$ is the minimum or not cannot be determined as easily. When candidates for the minimum value are found, the true minimum needs to be searched by setting up further finer intervals.

[1.5] Supersampling

When deciding the correspondence between the pixels, the range of $f^{(m,s)}$ can be expanded to R×R (R being the set of real numbers) in order to increase the degree of freedom. In this case, the intensity of the pixels of the destination image is interpolated, to provide $f^{(m,s)}$ having an intensity at non-integer points:

$$V\left(q_{f^{(m,s)}(i,j)}^{(m,s)}\right) \tag{36}$$

That is, supersampling is performed. In an example implementation, $f^{(m,s)}$ may take integer and half integer values, and $$V(q_{(i,j)+(0.5,0.5)}^{(m,s)}) \qquad (37)$$

is given by $$(V(q_{(i,j)}^{(m,s)}) + V(q_{(i,j)+(1,1)}^{(m,s)}))/2 \qquad (38)$$

[1. 6] Normalization of the Pixel Intensity of Each Image

When the source and destination images contain quite different objects, the raw pixel intensity may not be used to compute the mapping because a large difference in the pixel intensity causes excessively large energy $C_f^{(m,s)}$ and thus making it difficult to obtain an accurate evaluation.

For example, a matching between a human face and a cat's face is computed as shown in FIGS. 20(a) and 20(b). The cat's face is covered with hair and is a mixture of very bright pixels and very dark pixels. In this case, in order to compute the submappings of the two faces, subimages are normalized. That is, the darkest pixel intensity is set to 0 while the brightest pixel intensity is set to 255, and other pixel intensity values are obtained using linear interpolation.

[1. 7] Implementation

In an example implementation, a heuristic method is utilized wherein the computation proceeds linearly as the source image is scanned. First, the value of $f^{(m,s)}$ is determined at the top leftmost pixel (i,j)=(0,0). The value of each $f^{(m,s)}$ (i,j) is then determined while i is increased by one at each step. When i reaches the width of the image, j is increased by one and i is reset to zero. Thereafter, $f^{(m,s)}$ (i,j) is determined while scanning the source image. Once pixel correspondence is determined for all the points, it means that a single mapping $f^{(m,s)}$ is determined.

When a corresponding point $q_{f(i,j)}$ is determined for $p_{(i,j)}$, a corresponding point $q_{f(i,j+1)}$ of $p_{(i,j+1)}$ is determined next. The position of $q_{f(i,j+1)}$ is constrained by the position of $q_{f(i,j)}$ since the position of $q_{f(i,j+1)}$ satisfies the BC. Thus, in this system, a point whose corresponding point is determined earlier is given higher priority. If the situation continues in which (0,0) is always given the highest priority, the final mapping might be unnecessarily biased. In order to avoid this bias, $f^{(m,s)}$ is determined in the following manner in the base technology.

First, when (s mod 4) is 0, $f^{(m,s)}$ is determined starting from (0,0) while gradually increasing both i and j. When (s mod 4) is 1, $f^{(m,s)}$ is determined starting from the top rightmost location while decreasing i and increasing j. When (s mod 4) is 2, $f^{(m,s)}$ is determined starting from the bottom rightmost location while decreasing both i and j. When (s mod 4) is 3, $f^{(m,s)}$ is determined starting from the bottom leftmost location while increasing i and decreasing j. Since a concept such as the submapping, that is, a parameter s, does not exist in the finest n-th level, $f^{(m,s)}$ is computed continuously in two directions on the assumption that s=0 and s=2.

In this implementation, the values of $f^{(m,s)}$ (i,j) (m=0, . . . ,n) that satisfy the BC are chosen as much as possible from the candidates (k,l) by imposing a penalty on the candidates violating the BC. The energy $D_{(k,l)}$ of a candidate that violates the third condition of the BC is multiplied by $\phi$ and that of a candidate that violates the first or second condition of the BC is multiplied by $\psi$. In this implementation, $\phi=2$ and $\psi=100000$ are used.

In order to check the above-mentioned BC, the following test may be performed as the procedure when determining $$(k, l) = f^{(m,s)}(i, j).$$

Namely, for each grid point (k,l) in the inherited quadrilateral of $f^{(m,s)}$ (i,j), whether or not the z-component of the outer product of $$W = \vec{A} \times \vec{B} \qquad (39)$$

is equal to or greater than 0 is examined, where $$\vec{A} = \overrightarrow{q_{f(m,s)(i,j-1)}^{(m,s)} q_{f(m,s)(i+1,j-1)}^{(m,s)}} \qquad (40)$$

$$\vec{B} = \overrightarrow{q_{f(m,s)(i,j-1)}^{(m,s)} q_{(k,l)}^{(m,s)}} \qquad (41)$$

Here, the vectors are regarded as 3D vectors and the z-axis is defined in the orthogonal right-hand coordinate system. When W is negative, the candidate is imposed with a penalty by multiplying $D_{(k,l)}^{(m,s)}$ by $\psi$ so that it is not as likely to be selected.

Figure 5A:
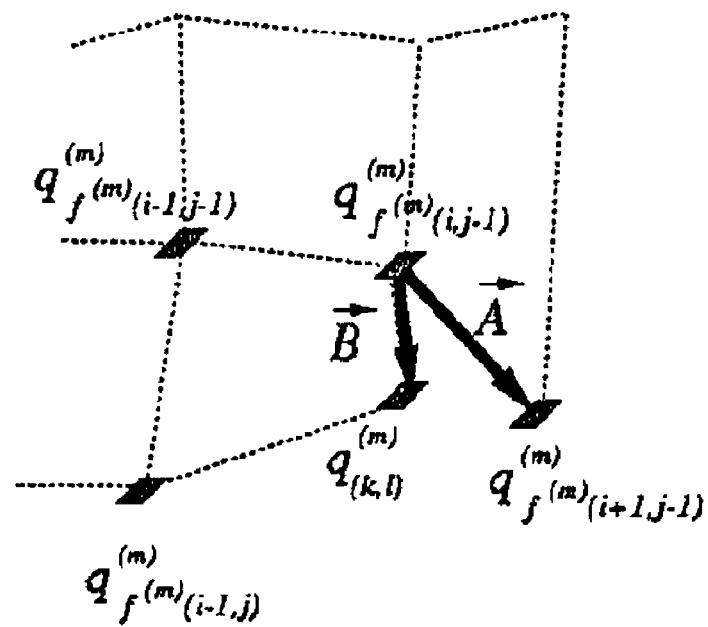
FIG. 5($a$) is a diagram illustrating determination of whether or not the mapping for a certain point satisfies the bijectivity condition through the outer product computation.
Figure 5B:
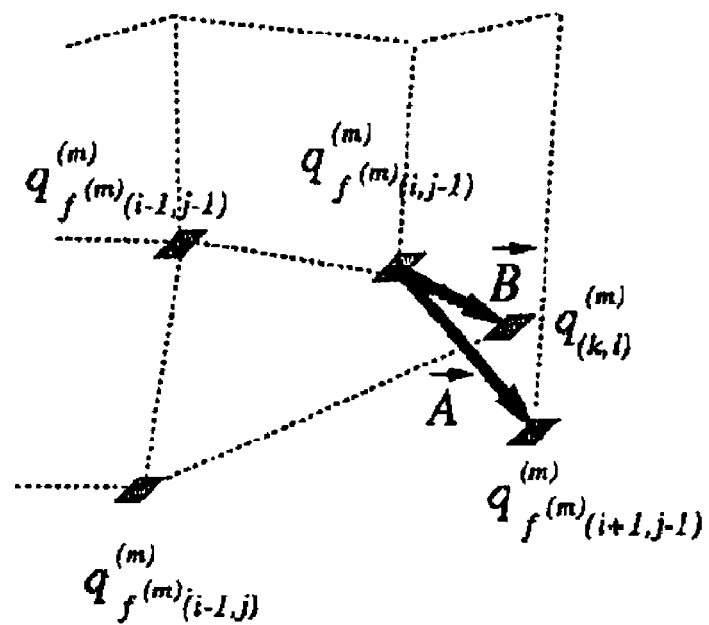

FIGS. 5(a) and 5(b) illustrate the reason why this condition is inspected. FIG. 5(a) shows a candidate without a penalty and FIG. 5(b) shows one with a penalty. When determining the mapping $f^{(m,s)}$ (i,j+1) for the adjacent pixel at (i,j+1), there is no pixel on the source image plane that satisfies the BC if the z-component of W is negative because then $q_{(k,l)}^{(m,s)}$ passes the boundary of the adjacent quadrilateral.

[1. 7. 1] The Order of Submappings

In this implementation, $\sigma(0)=0$, $\sigma(1)=1$, $\sigma(2)=2$, $\sigma(3)=3$, $\sigma(4)=0$ are used when the resolution level is even, while $\sigma(0)=3$, $\sigma(1)=2$, $\sigma(2)=1$, $\sigma(3)=0$, $\sigma(4)=3$ are used when the resolution level is odd. Thus, the submappings are shuffled to some extent. It is to be noted that the submappings are primarily of four types, and s may be any of 0 to 3. However, a processing with s=4 is used in this implementation for a reason to be described later.

[1. 8] Interpolations

After the mapping between the source and destination images is determined, the intensity values of the corresponding pixels are interpolated. In the implementation, trilinear interpolation is used. Suppose that a square $p_{(i,j)}p_{(i+1,j)}p_{(i+1,j+1)}p_{(i,j+1)}$ on the source image plane is mapped to a quadrilateral $q_{f(i,j)}q_{f(i+1,j)}q_{f(i+1,j+1)}q_{f(i,j+1)}$ on the destination image plane. For simplicity, the distance between the image planes is assumed to be 1. The intermediate image pixels r(x,y,t) ($0 \leq x \leq N-1$, $0 \leq y \leq M-1$) whose distance from the source image plane is t ($0 \leq t \leq 1$) are obtained as follows. First, the location of the pixel r(x,y,t), where x,y,t$\in$R, is determined by equation (42):

$$(x, y) = (1 - dx)(1 - dy)(1 - t)(i, j) + (1 - dx)(1 - dy)tf(i, j) + \qquad (42)$$

-continued $$dx(1-dy)(1-t)(i+1, j) + dx(1-dy)tf(i+1, j) +$$
$$(1-dx)dy(1-t)(i, j+1) + (1-dx)dytf(i, j+1) +$$
$$dxdy(1-t)(i+1, j+1) + dxdytf(i+1, j+1)$$

The value of the pixel intensity at r(x,y,t) is then determined by equation (43):

$$V(r(x, y, t)) = (1-dx)(1-dy)(1-t)V(p_{(i,j)}) + \qquad (43)$$
$$(1-dx)(1-dy)tV(q_{f(i,j)}) +$$
$$dx(1-dy)(1-t)(p_{(i+1,j)}) +$$
$$dx(1-dy)tV(q_{f(i+1,j)}) +$$
$$(1-dx)dy(1-t)V(p_{(i,j+1)}) +$$
$$(1-dx)dytV(q_{f(i,j+1)}) +$$
$$dxdy(1-t)V(p_{(i+1,j+1)}) + dxdytV(q_{f(i+1,j+1)})$$

where dx and dy are parameters varying from 0 to 1.

[1. 9] Mapping to which Constraints are Imposed

So far, the determination of a mapping in which no constraints are imposed has been described. However, if a correspondence between particular pixels of the source and destination images is provided in a predetermined manner, the mapping can be determined using such correspondence as a constraint.

The basic idea is that the source image is roughly deformed by an approximate mapping which maps the specified pixels of the source image to the specified pixels of the destination image and thereafter a mapping f is accurately computed.

First, the specified pixels of the source image are mapped to the specified pixels of the destination image, then the approximate mapping that maps other pixels of the spurce image to appropriate locations are determined. In other words, the mapping is such that pixels in the vicinity of a specified pixel are mapped to locations near the position to which the specified one is mapped. Here, the approximate mapping at the m-th level in the resolution hierarchy is denoted by $F^{(m)}$.

The approximate mapping F is determined in the following manner. First, the mappings for several pixels are specified. When $n_s$ pixels $$p(i_0, j_0), p(i_1, j_1), \ldots, p(i_{n_s-1}, j_{n_s-1}) \qquad (44)$$

of the source image are specified, the following values in the equation (45) are determined.

$$F^{(n)}(i_0, j_0) = (k_0, l_0), \qquad (45)$$
$$F^{(n)}(i_1, j_1) = (k_1, l_1), \ldots ,$$
$$F^{(n)}(i_{n_s-1}, j_{n_s-1}) = (k_{n_s-1}, l_{n_s-1})$$

For the remaining pixels of the source image, the amount of displacement is the weighted average of the displacement of $p(i_h, j_h)$ (h=0, ..., $n_s$−1). Namely, a pixel $p_{(i,j)}$ is mapped to the following pixel (expressed by the equation (46)) of the destination image.

$$F^{(m)}(i, j) = \frac{(i, j) + \sum_{h=0}^{h=n_s-1} (k_h - i_h, l_h - j_h)\text{weight}_h(i, j)}{2^{n-m}} \qquad (46)$$

where $$\text{weight}_h(i, j) = \frac{1/\|(i_h - i, j_h - j)\|^2}{\text{total\_weight}(i, j)} \qquad (47)$$

where $$\text{total\_weight}(i, j) = \sum_{h=0}^{h=n_s-1} 1/\|(i_h - i, j_h - j)\|^2 \qquad (48)$$

Second, the energy $D_{(i,j)}^{(m,s)}$ of the candidate mapping f is changed so that a mapping f similar to $F^{(m)}$ has a lower energy. Precisely speaking, $D_{(i,j)}^{(m,s)}$ is expressed by the equation (49):

$$D_{(i,j)}^{(m,s)} = E_{0(i,j)}^{(m,s)} + \eta E_{1(i,j)}^{(m,s)} + \kappa E_{2(i,j)}^{(m,s)} \qquad (49)$$

where $$E_{2(i,j)}^{(m,s)} = \qquad (50)$$
$$\begin{cases} 0, & \text{if } \|F^{(m)}(i, j) - f^{(m,s)}(i, j)\|^2 \le \left\lfloor \frac{\rho^2}{2^{2(n-m)}} \right\rfloor \\ \|F^{(m)}(i, j) - f^{(m,s)}(i, j)\|^2, & \text{otherwise} \end{cases}$$

where $\kappa, \rho \ge 0$. Finally, the resulting mapping f is determined by the above-described automatic computing process.

Note that $E_{2(i,j)}^{(m,s)}$ becomes 0 if $f^{(m,s)}(i,j)$ is sufficiently close to $F^{(m)}(i,j)$ i.e., the distance therebetween is equal to or less than $$\left\lfloor \frac{\rho^2}{2^{2(n-m)}} \right\rfloor \qquad (51)$$

This has been defined in this way because it is desirable to determine each value $f^{(m,s)}(i,j)$ automatically to fit in an appropriate place in the destination image as long as each value $f^{(m,s)}(i,j)$ is close to $F^{(m)}(i,j)$. For this reason, there is no need to specify the precise correspondence in detail to have the source image automatically mapped so that the source image matches the destination image.

[2] Concrete Processing Procedure

The flow of a process utilizing the respective elemental techniques described in [1] will now be described.

Figure 6:
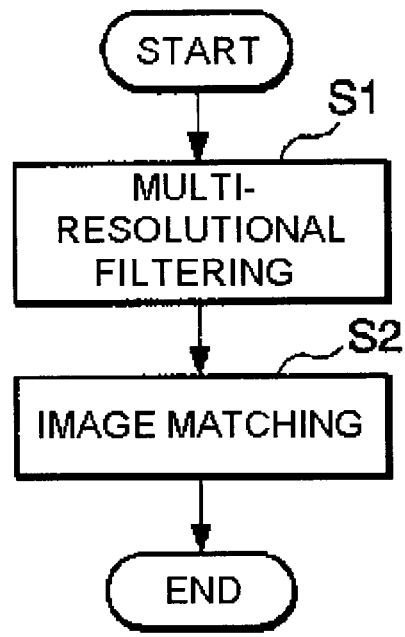
FIG. 6 is a flowchart of the entire procedure of a preferred embodiment in the base technology.

FIG. 6 is a flowchart of the overall procedure of the base technology. Referring to FIG. 6, a source image and destination image are first processed using a multiresolutional critical point filter (S1). The source image and the destination image are then matched (S2). As will be understood, the matching (S2) is not required in every case, and other processing such as image recognition may be performed instead, based on the characteristics of the source image obtained at S1.

Figure 7:
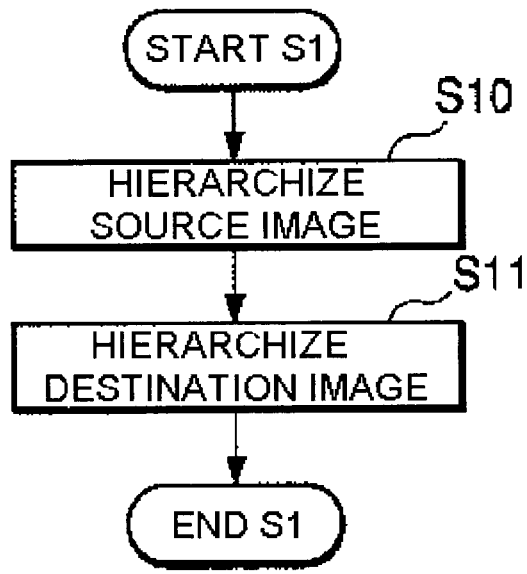
FIG. 7 is a flowchart showing the details of the process at S1 in FIG. 6.

FIG. 7 is a flowchart showing details of the process S1 shown in FIG. 6. This process is performed on the assumption that a source image and a destination image are matched at S2. Thus, a source image is first hierarchized using a critical point filter (S10) so as to obtain a series of source hierarchical images. Then, a destination image is hierarchized in the similar manner (S11) so as to obtain a series of destination hierarchical images. The order of S10 and S11 in the flow is arbitrary, and the source image and the destination image can be generated in parallel. It may also be possible to process a number of source and destination images as required by subsequent processes.

Figure 8:
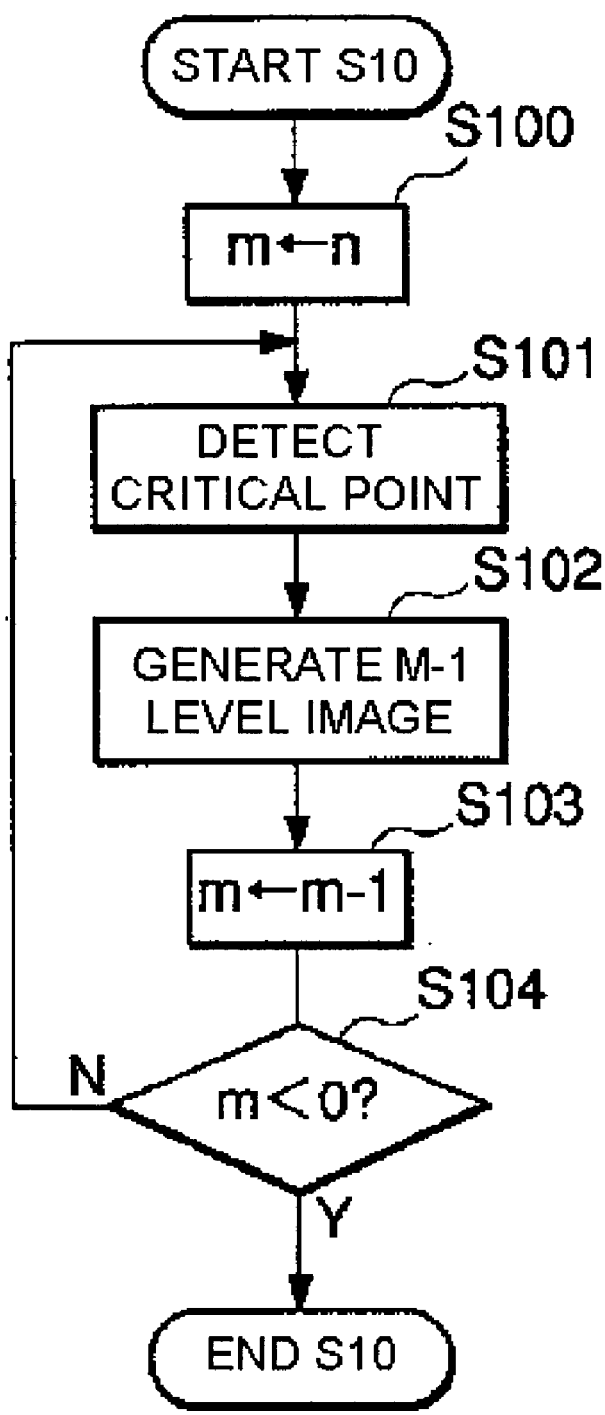
FIG. 8 is a flowchart showing the details of the process at S10 in FIG. 7.

FIG. 8 is a flowchart showing details of the process at S10 shown in FIG. 7. Suppose that the size of the original source image is $2^n \times 2^n$. Since source hierarchical images are sequentially generated from an image with a finer resolution to one with a coarser resolution, the parameter m which indicates the level of resolution to be processed is set to n (S100). Then, critical points are detected from the images $p^{(m,0)}$, $p^{(m,1)}$, $p^{(m,2)}$ and $p^{(m,3)}$ the m-th level of resolution, using a critical point filter (S101), so that the images $p^{(m-1,0)}$, $p^{(m-1,1)}$, $p^{(m-1,2)}$ and $p^{(m-1,3)}$ of the (m−1) th level are generated (S102). Since m=n here $p^{(m,0)} = p^{(m,1)} = p^{(m,2)} = p^{(m,3)} = p^{(n)}$ holds and four types of subimages are thus generated from a single source image.

Figure 9:
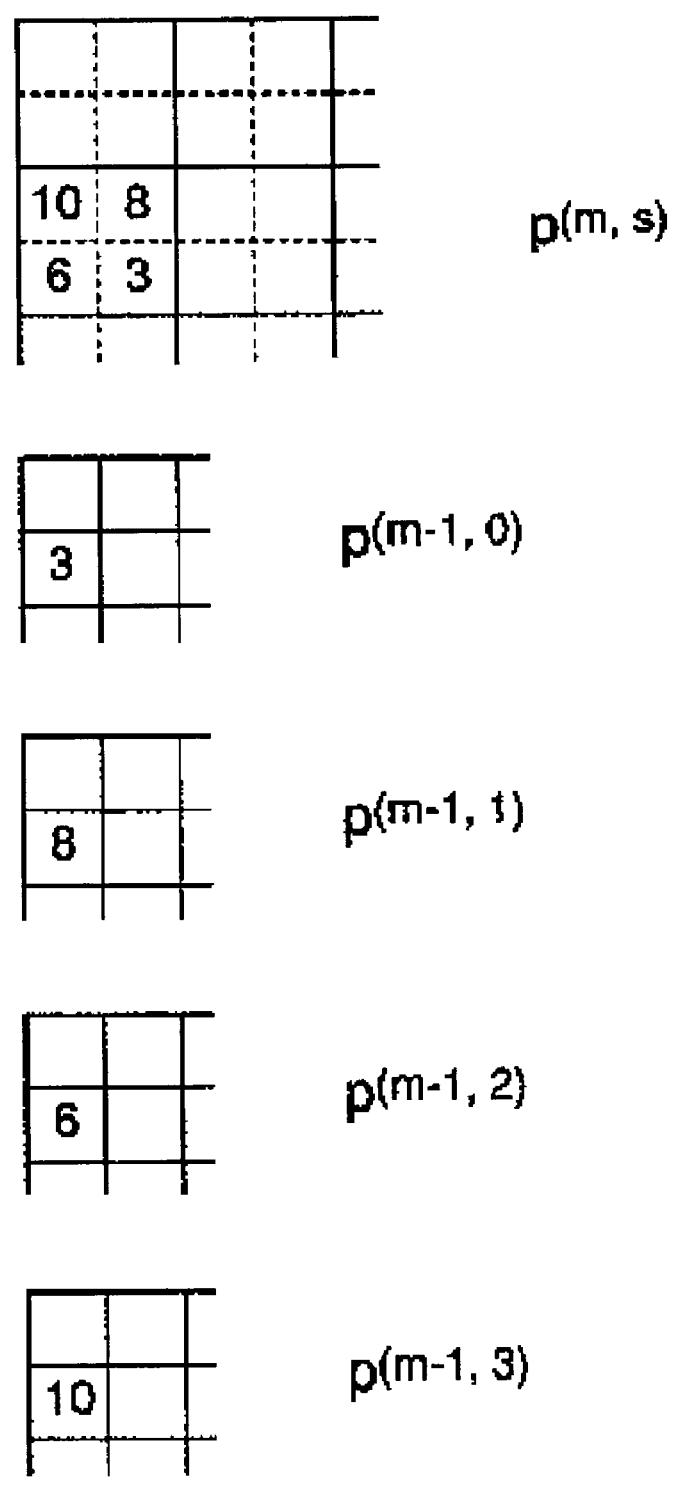

FIG. 9 shows correspondence between partial images of the m-th and those of (m−1)th levels of resolution. Referring to FIG. 9, respective numberic values shown in the figure represent the intensity of respective pixels. $p^{(m,s)}$ symbolizes any one of four images $p^{(m,0)}$ through $p^{(m,3)}$, and when generating $p^{(m-1,0)}$, $p^{(m,0)}$ is used from $p^{(m,s)}$. For example, as for the block shown in FIG. 9, comprising four pixels with their pixel intensity values indicated inside, images $p^{(m-1,0)}$, $p^{(m-1,1)}$, $p^{(m-1,2)}$ and $p^{(m-1,3)}$ acquire "3", "8", "6" and "10", respectively, according to the rules described in [1.2]. This block at the m-th level is replaced at the (m−1)th level by respective single pixels thus acquired. Therefore, the size of the subimages at the (m−1)th level is $2^{m-1} \times 2^{m-1}$.

After m is decremented (S103 in FIG. 8), it is ensured that m is not negative (S104). Thereafter, the process returns to S101, so that subimages of the next level of resolution, i.e., a next coarser level, are generated. The above process is repeated until subimages at m=0 (0-th level) are generated to complete the process at S10. The size of the subimages at the 0-th level is 1×1.

Figure 10:
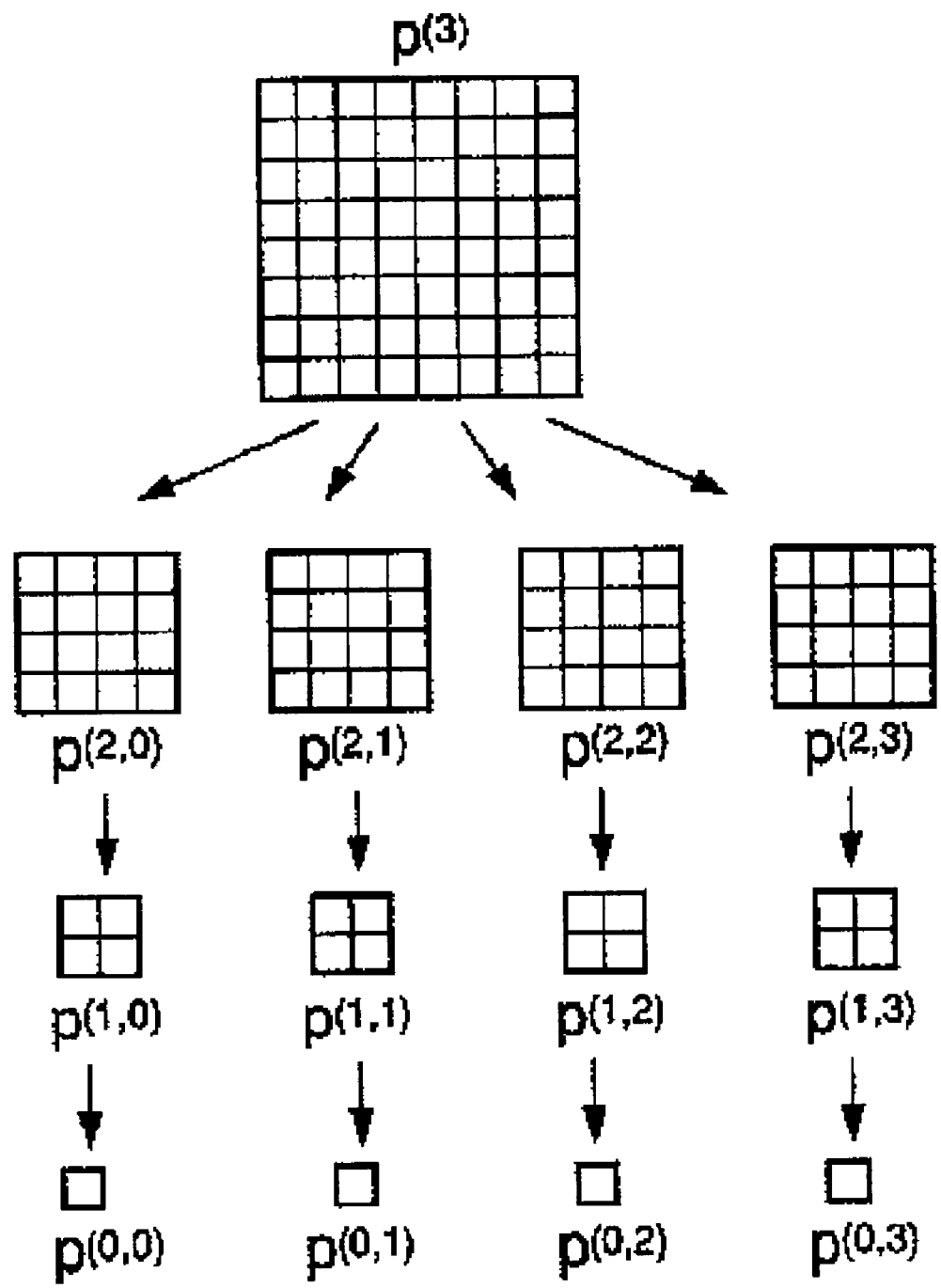
FIG. 10 is a diagram showing source hierarchical images generated in the embodiment in the base technology.

FIG. 10 shows source hierarchical images generated at S10 in the case of n=3. The initial source image is the only image common to the four series followed. The four types of subimages are generated independently, depending on the type of critical point. Note that the process in FIG. 8 is common to S11 shown in FIG. 7, and that destination hierarchical images are generated through a similar procedure. Then, the process at S1 in FIG. 6 is completed.

Figure 11:
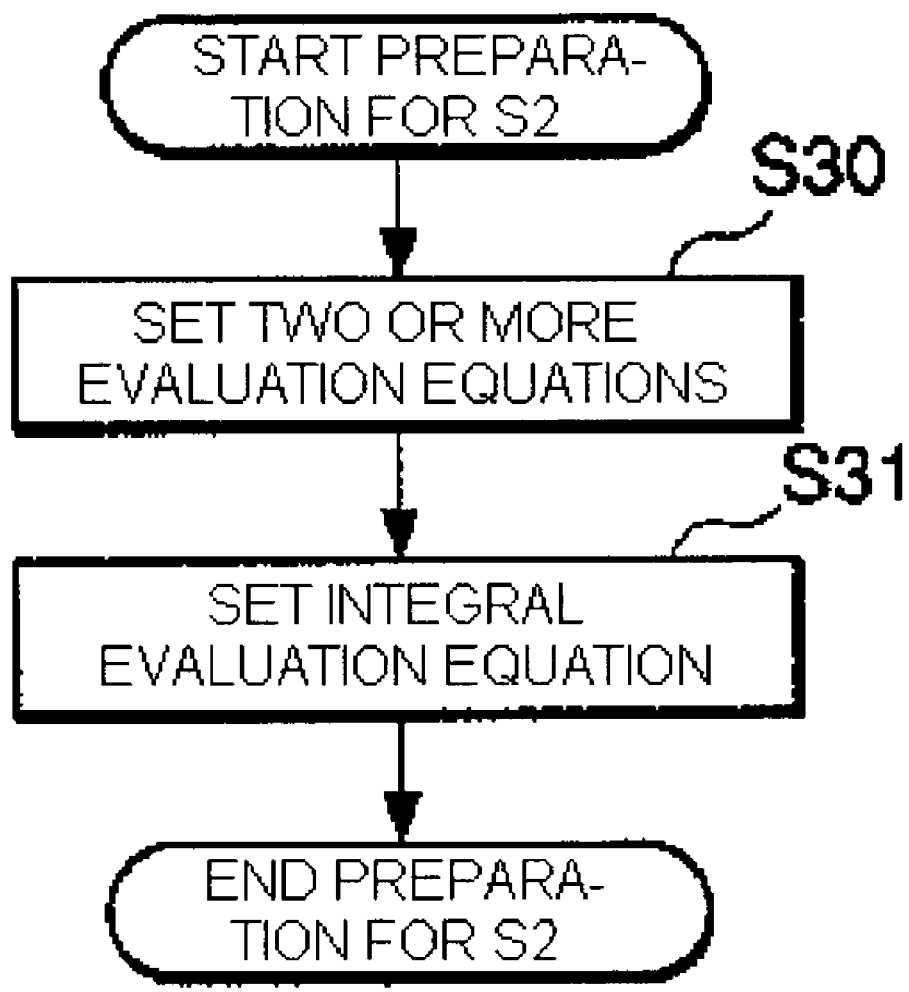
FIG. 11 is a flowchart of a preparation procedure for S2 in FIG. 6.

In this base technology, in order to proceed to S2 shown in FIG. 6 a matching evaluation is prepared. FIG. 11 shows the preparation procedure. Referring to FIG. 11, a plurality of evaluation equations are set (S30). The evaluation equations may include the energy $C_f^{(m,s)}$ concerning a pixel value, introduced in [1.3.2.1], and the energy $D_f^{(m,s)}$ concerning the smoothness of the mapping introduced in [1.3.2.2]. Next, by combining these evaluation equations, a combined evaluation equation is set (S31). Such a combined evaluation equation may be $$\lambda C_{(i,j)}^{(m,s)} + D_f^{(m,s)}.$$

Using η introduced in [1.3.2.2], we have $$\sum \sum (\lambda C_{(i,j)}^{(m,s)} + \eta E_{0(i,j)}^{(m,s)} + E_{1(i,j)}^{(m,s)}) \qquad (52)$$

In the equation (52) the sum is taken for each i and j where i and j run through 0, 1, . . . , $2^{m-1}$. Now, the preparation for matching evaluation is completed.

Figure 12:
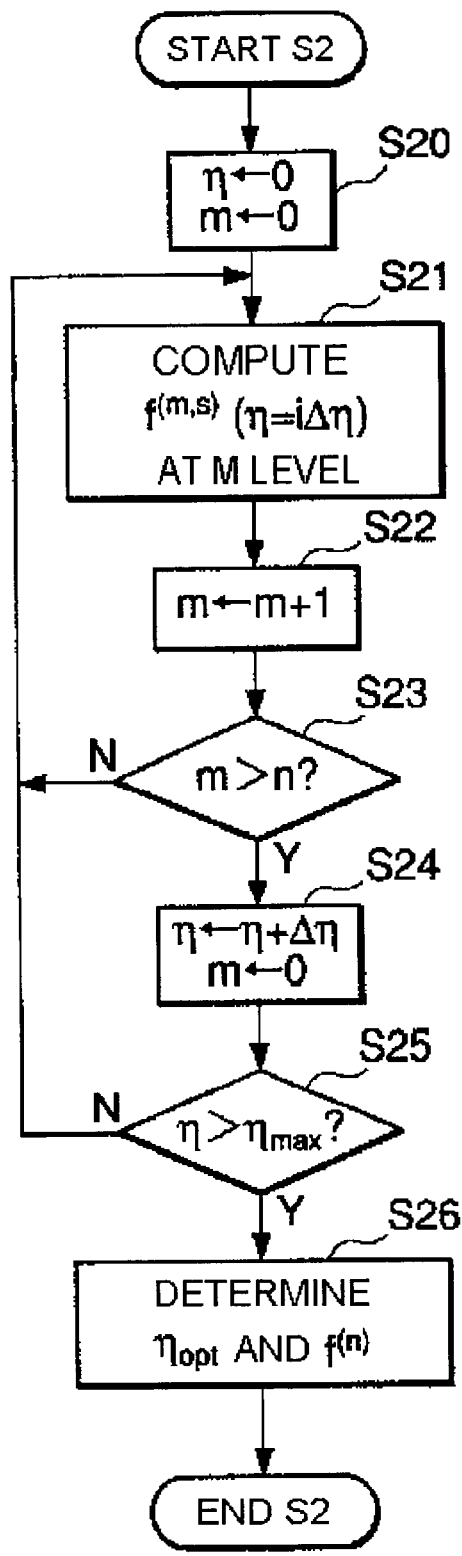
FIG. 12 is a flowchart showing the details of the process at S2 in FIG. 6.

FIG. 12 is a flowchart showing the details of the process of S2 shown in FIG. 6. As described in [1], the source hierarchical images and destination hierarchical images are matched between images having the same level of resolution. In order to detect global correspondence correctly, a matching is calculated in sequence from a coarse level to a fine level of resolution. Since the source and destination hierarchical images are generated using the critical point filter, the location and intensity of critical points are stored clearly even at a coarse level. Thus, the result of the global matching is superior to conventional methods.

Referring to FIG. 12, a coefficient parameter η and a level parameter m are set to 0 (S20). Then, a matching is computed between the four subimages at the m-th level of the source hierarchical images and those of the destination hierarchical images at the m-th level, so that four types of submappings $f^{(m,s)}$ (s=0, 1, 2, 3) which satisfy the BC and minimize the energy are obtained (S21). The BC is checked by using the inherited quadrilateral described in [1.3.3]. In that case, the submappings at the m-th level are constrained by those at the (m−1)th level, as indicated by the equations (17) and (18). Thus, the matching computed at a coarser level of resolution is used in subsequent calculation of a matching. This is called a vertical reference between different levels. If m=0, there is no coarser level and this exceptional case will be described using FIG. 13.

A horizontal reference within the same level is also performed. As indicated by the equation (20) in [1.3.3], $f^{(m,3)}$, $f^{(m,2)}$ and $f^{(m,1)}$ are respectively determined so as to be analogous to $f^{(m,2)}$, $f^{(m,1)}$ and $f^{(m,0)}$. This is because a situation in which the submappings are totally different seems unnatural even though the type of critical points differs so long as the critical points are originally included in the same source and destination images. As can been seen from the equation (20), the closer the submappings are to each other, the smaller the energy becomes, so that the matching is then considered more satisfactory.

As for $f^{(m,0)}$, which is to be initially determined, a coarser level by one may be referred to since there is no other submapping at the same level to be referred to as shown in the equation (19). In this base technology, however, a procedure is adopted such that after the submappings were obtained up to $f^{(m,3)}$, $f^{(m,0)}$ is recalculated once utilizing the thus obtained submappings as a constraint. This procedure is equivalent to a process in which s=4 is substituted into the equation (20) and $f^{(m,4)}$ is set to $f^{(m,0)}$ anew. The above process is employed to avoid the tendency in which the degree of association between $f^{(m,0)}$ and $f^{(m,3)}$ becomes too low. This scheme actually produced a preferable result. In addition to this scheme, the submappings are shuffled in the experiment as described in [1.7.1], so as to closely maintain the degrees of association among submappings which are originally determined independently for each type of critical point. Furthermore, in order to prevent the tendency of being dependent on the starting point in the process, the location thereof is changed according to the value of s as described in [1.7].

Figure 13:
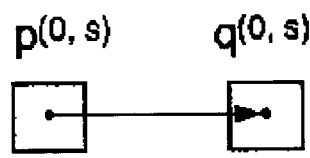
FIG. 13 is a diagram showing the way a submapping is determined at the 0-th level.
Figure 14:
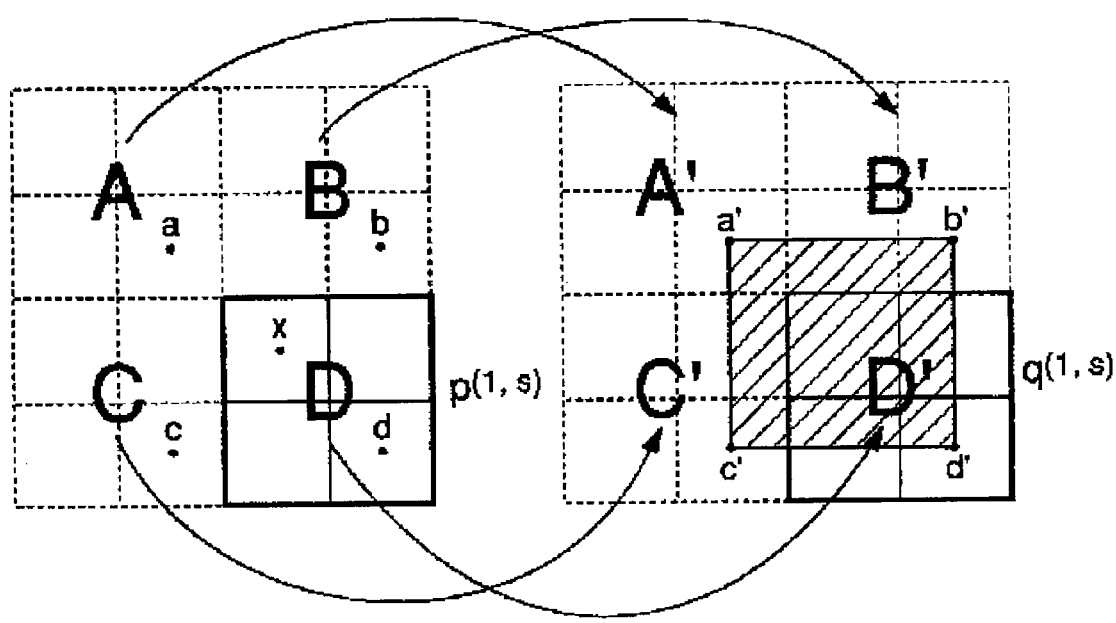
FIG. 14 is a diagram showing the way a submapping is determined at the first level.

FIG. 13 illustrates how the submapping is determined at the 0-th level. Since at the 0-th level each sub-image is constituted by a single pixel, the four submappings $f^{(0,s)}$ are automatically chosen as the identity mapping. FIG. 14 shows how the submappings are determined at the first level. At the first level, each of the sub-images is constituted of four pixels, which are indicated by solid lines. When a corresponding point (pixel) of the point (pixel) x in $p^{(1,s)}$ is searched within $q^{(1,s)}$, the following procedure is adopted:

1. An upper left point a, an upper right point b, a lower left point c and a lower right point d with respect to the point x are obtained at the first level of resolution.
2. Pixels to which the points a to d belong at a coarser level by one, i.e., the 0-th level, are searched. In FIG. 14, the points a to d belong to the pixels A to D, respectively. However, the pixels A to C are virtual pixels which do not exist in reality.
3. The corresponding points A' to D' of the pixels A to D, which have already been defined at the 0-th level, are plotted in $q^{(1,s)}$. The pixels A' to C' are virtual pixels and regarded to be located at the same positions as the pixels A to C.
4. The corresponding point a' to the point a in the pixel A is regarded as being located inside the pixel A', and the point a' is plotted. Then, it is assumed that the position occupied by the point a in the pixel A (in this case, positioned at the lower right) is the same as the position occupied by the point a' in the pixel A'.
5. The corresponding points b' to d' are plotted by using the same method as the above 4 so as to produce an inherited quadrilateral defined by the points a' to d'.
6. The corresponding point x' of the point x is searched such that the energy becomes minimum in the inherited quadrilateral. Candidate corresponding points x' may be limited to the pixels, for instance, whose centers are included in the inherited quadrilateral. In the case shown in FIG. 14, the four pixels all become candidates.

The above described is a procedure for determining the corresponding point of a given point x. The same processing is performed on all other points so as to determine the submappings. As the inherited quadrilateral is expected to become deformed at the upper levels (higher than the second level), the pixels A' to D' will be positioned apart from one another as shown in FIG. 3.

Once the four submappings at the m-th level are determined in this manner, m is incremented (S22 in FIG. 12). Then, when it is confirmed that m does not exceed n (S23), return to S21. Thereafter, every time the process returns to S21, submappings at a finer level of resolution are obtained until the process finally returns to S21 at which time the mapping $f^{(n)}$ at the n-th level is determined. This mapping is denoted as $f^{(n)}$ ($\eta$=0) because it has been determined relative to $\eta$=0.

Next, to obtain the mapping with respect to other different $\eta$, $\eta$ is shifted by $\Delta\eta$ and m is reset to zero (S24). After confirming that new $\eta$ does not exceed a predetermined search-stop value $\eta_{max}$(S25), the process returns to S21 and the mapping $f^{(n)}$ ($\eta=\Delta\eta$) relative to the new $\eta$ is obtained. This process is repeated while obtaining $f^{(n)}$ ($\eta=i\Delta\eta$) (i=0,1, . . . ) at S21. When $\eta$ exceeds $\eta_{max}$, the process proceeds to S26 and the optimal $\eta=\eta_{opt}$ is determined using a method described later, so as to let $f^{(n)}$ ($\eta=\eta_{opt}$) be the final mapping $f^{(n)}$.

Figure 15:
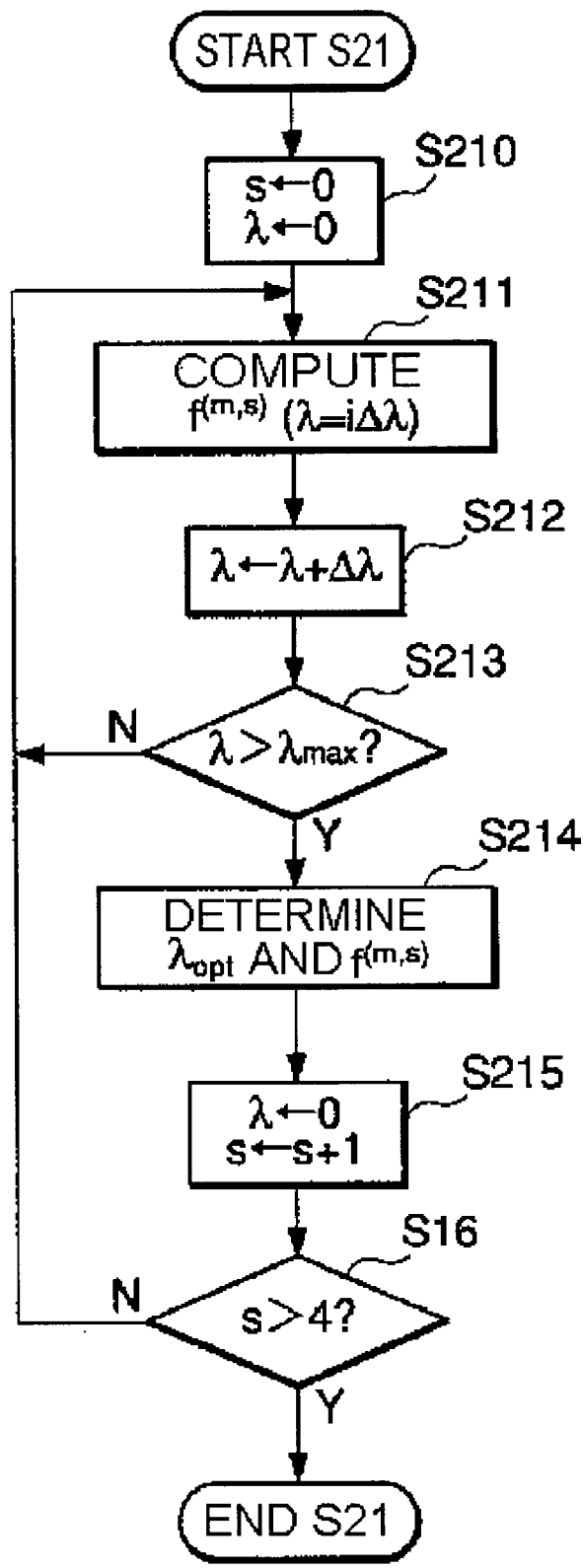
FIG. 15 is a flowchart showing the details of the process at S21 in FIG. 12.

FIG. 15 is a flowchart showing the details of the process of S21 shown in FIG. 12. According to this flowchart, the submappings at the m-th level are determined for a certain predetermined $\eta$. In this base technology, when determining the mappings, the optimal $\lambda$ is defined independently for each submapping.

Referring to FIG. 15, s and $\lambda$ are first reset to zero (S210). Then, obtained is the submapping $f^{(m,s)}$ that minimizes the energy with respect to the then $\lambda$ (and, implicitly, $\eta$) (S211), and the thus obtained submapping is denoted as $f^{(m,s)}$ ($\lambda$=0). In order to obtain the mapping with respect to other different $\lambda$, $\lambda$ is shifted by $\Delta\lambda$. After confirming that the new $\lambda$ does not exceed a predetermined search-stop value $\lambda_{max}$ (S213), the process returns to S211 and the mapping $f^{(m,s)}$ ($\lambda=\Delta\lambda$) relative to the new $\lambda$ is obtained. This process is repeated while obtaining $f^{(m,s)}$ ($\lambda=i\Delta\lambda$)(i=0,1, . . . ). When $\lambda$ exceeds $\lambda_{max}$, the process proceeds to S214 and the optimal $\lambda=\lambda_{opt}$ is determined , so as to let $f^{(n)}$ ($\lambda=\lambda_{opt}$) be the final mapping $f^{(m,s)}$ (S214).

Next, in order to obtain other submappings at the same level, $\lambda$ is reset to zero and s is incremented (S215). After confirming that s does not exceed 4 (S216), return to S211. When s=4, $f^{(m,0)}$ is renewed utilizing $f^{(m,3)}$ as described above and a submapping at that level is determined.

Figure 16:
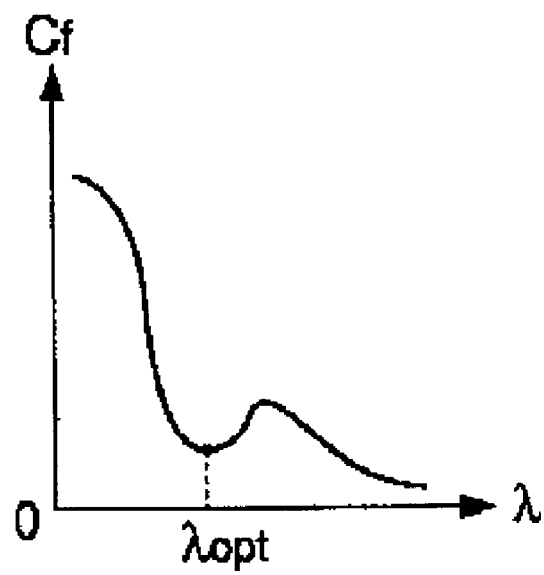
FIG. 16 is a graph showing the behavior of energy $C_f^{(m,s)}$ corresponding to $f^{(m,s)}$ ($\lambda=i\Delta\lambda$) which has been obtained for a certain $f^{(m,s)}$ while varying $\lambda$.

FIG. 16 shows the behavior of the energy $C_f^{(m,s)}$ corresponding to $f^{(m,s)}$ ($\lambda=i\Delta\lambda$) (i=0,1, . . . ) for a certain m and s while varying $\lambda$. As described in [1.4], as $\lambda$ increases, $C_f^{(m,s)}$ normally decreases but changes to increase after $\lambda$ exceeds the optimal value. In this base technology, $\lambda$ in which $C_f^{(m,s)}$ becomes the minima is defined as $\lambda_{opt}$. As observed in FIG. 16, even if $C_f^{(m,s)}$ begins to decrease again in the range $\lambda>\lambda_{opt}$, the mapping will not be as good. For this reason, it suffices to pay attention to the first occurring minima value. In this base technology, $\lambda_{opt}$ is independently determined for each submapping including $f^{(n)}$.

Figure 17:
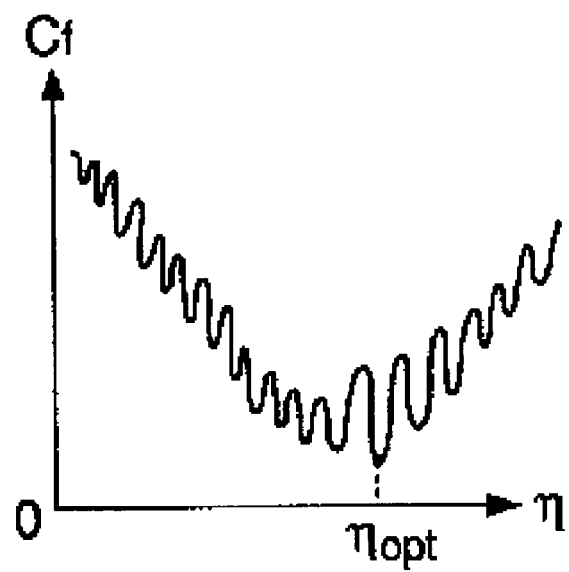
FIG. 17 is a diagram showing the behavior of energy $C_f^{(n,s)}$ corresponding to $f^{(n)}$ ($\eta=i\Delta\eta$) (i=0,1, . . . ) which has been obtained while varying $\eta$.

FIG. 17 shows the behavior of the energy $C_f^{(n)}$ corresponding to $f^{(n)}$ ($\eta=i\Delta\eta$) (i=0,1, . . . ) while varying $\eta$. Here too, $C_f^{(n)}$ normally decreases as $\eta$ increases, but $C_f^{(n)}$ changes to increase after $\eta$ exceeds the optimal value. Thus, $\eta$ in which $C_f^{(n)}$ becomes the minima is defined as $\eta_{opt}$. FIG. 17 can be considered as an enlarged graph around zero along the horizontal axis shown in FIG. 4. Once $\eta_{opt}$ is determined, $f^{(n)}$ can be finally determined.

As described above, this base technology provides various merits. First, since there is no need to detect edges, problems in connection with the conventional techniques of the edge detection type are solved. Furthermore, prior knowledge about objects included in an image is not necessitated, thus automatic detection of corresponding points is achieved. Using the critical point filter, it is possible to preserve intensity and locations of critical points even at a coarse level of resolution, thus being extremely advantageous when applied to object recognition, characteristic extraction, and image matching. As a result, it is possible to construct an image processing system which significantly reduces manual labor.

Some further extensions to or modifications of the above-described base technology may be made as follows:

(1) Parameters are automatically determined when the matching is computed between the source and destination hierarchical images in the base technology. This method can be applied not only to the calculation of the matching between the hierarchical images but also to computing the matching between two images in general.

For instance, an energy $E_0$ relative to a difference in the intensity of pixels and an energy $E_1$ relative to a positional displacement of pixels between two images may be used as evaluation equations, and a linear sum of these equations, i.e., $E_{tot}=\alpha E_0+E_1$, may be used as a combined evaluation equation. While paying attention to the neighborhood of the extrema in this combined evaluation equation, $\alpha$ is automatically determined. Namely, mappings which minimize $E_{tot}$ are obtained for various $\alpha$'s. Among such mappings, $\alpha$ at which $E_{tot}$ takes the minimum value is defined as an optimal parameter. The mapping corresponding to this parameter is finally regarded as the optimal mapping between the two images.

Many other methods are available in the course of setting up evaluation equations. For instance, a term which becomes larger as the evaluation result becomes more favorable, such as $1/E_1$ and $1/E_2$, may be employed. A combined evaluation equation is not necessarily a linear sum, but an n-powered sum (n=2, ½, −1, −2, etc.), a polynomial or an arbitrary function may be employed when appropriate.

The system may employ a single parameter such as the above $\alpha$, two parameters such as $\eta$ and $\lambda$ as in the base technology, or more than two parameters. When there are more than three parameters used, they may be determined while changing one at a time.

(2) In the base technology, a parameter is determined in a two-step process. That is, in such a manner that a point at which $C_f^{(m,s)}$ takes the minima is detected after a mapping such that the value of the combined evaluation equation becomes minimum is determined. However, instead of this two-step processing, a parameter may be effectively determined, as the case may be, in a manner such that the minimum value of a combined evaluation equation becomes minimum. In this case, $\alpha E_0+\beta E_1$, for example, may be used as the combined evaluation equation, where $\alpha+\beta=1$ may be imposed as a constraint so as to equally treat each evaluation equation. The automatic determination of a parameter is effective when determining the parameter such that the energy becomes minimum.

(3) In the base technology, four types of submappings related to four types of critical points are generated at each level of resolution. However, one, two, or three types among the four types may be selectively used. For instance, if there exists only one bright point in an image, generation of hierarchical images based solely on $f^{(m,3)}$ related to a maxima point can be effective to a certain degree. In this case, no other submapping is necessary at the same level, thus the amount of computation relative on s is effectively reduced.

(4) In the base technology, as the level of resolution of an image advances by one through a critical point filter, the number of pixels becomes ¼. However, it is possible to suppose that one block consists of 3×3 pixels and critical points are searched in this 3×3 block, then the number of pixels will be ⅑ as the level advances by one.

(5) In the base technology, if the source and the destination images are color images, they would generally first be converted to monochrome images, and the mappings then computed. The source color images may then be transformed by using the mappings thus obtained. However, as an alternate method, the submappings may be computed regarding each RGB component.

Image Coding Techniques

Image coding techniques utilizing the above-described base technology will now be described. First, techniques will be described in the following first embodiment, based on techniques in pending Japanese Patent Application No. 2001-21098 which is assigned to the same assignee of the present invention and is hereby incorporated by reference herein. Thereafter, further techniques will be described in which the concept of image trimming is introduced.

First Embodiment

Figure 18:
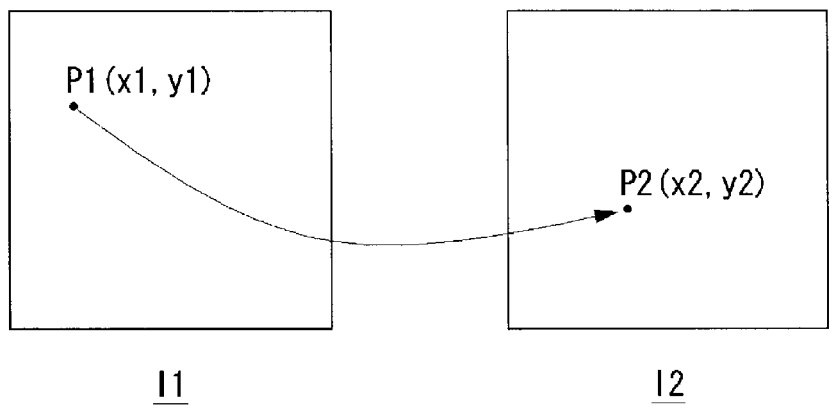
FIG. 18 shows how certain pixels correspond between a first image and a second image.

FIG. 18 shows a first image I1 and a second image I2 which serve as key frames, in which certain pixels $p_1(x_1, y_1)$ and $p_2(x_2, y_2)$ correspond therebetween. The correspondence of the pixels may be obtained using the base technology.

Figure 19:
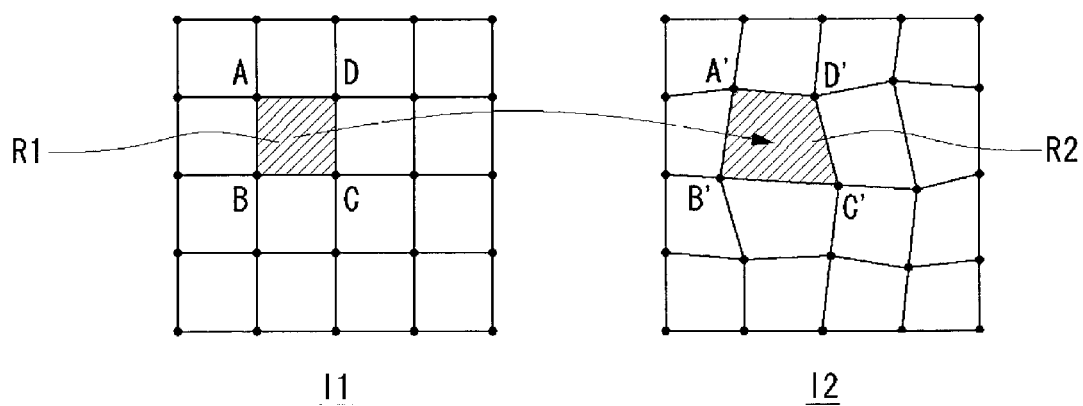
FIG. 19 shows a correspondence relation between a source polygon taken on the first image and a destination polygon taken on the second image.

Referring to FIG. 19, a mesh is provided on the first image I1 and corresponding positions of lattice points are shown on the second image I2. Now, a polygon R1 on the first image I1 is determined by four lattice points A, B, C and D. This polygon R1 is called a "source polygon." As has been shown in FIG. 18, these lattice points A, B, C and D have respectively corresponding points A', B', C' and D' on the second image I2, and a polygon R2 formed by the corresponding points is called a "destination polygon." In this embodiment, the source polygon is generally a rectangle while the destination polygon is generally a quadrilateral. In any event, according to the present embodiment, the correspondence relation between the first and second images I1 and I2 is not described pixel by pixel, instead, the corresponding points are described only with respect to the lattice points of the source polygon. This description is then written in a corresponding point file. By directing attention to the lattice points only, the volume of the corresponding point file can be reduced significantly.

As described in the base technology, the corresponding point file is utilized for generating an intermediate image of the first image I1 and the second image I2. In particular, intermediate images at arbitrary temporal or spatial positions can be generated by interpolating between the corresponding points. Thus, by using the first image I1, the second image I2 and the corresponding point file it is possible to generate morphing or smooth motion pictures between two images, thus obtaining a compression effect on motion pictures.

Figure 20:
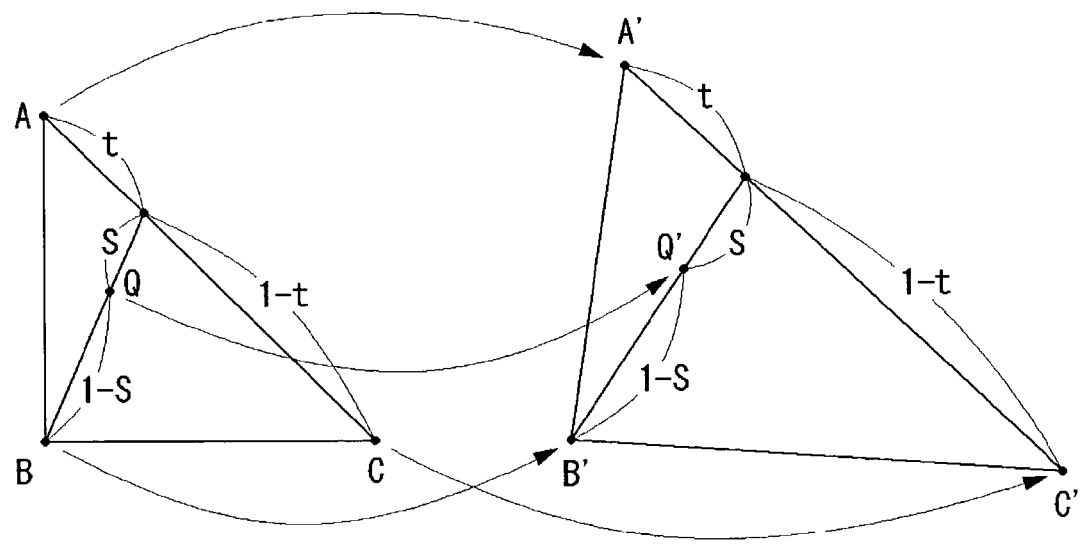
FIG. 20 illustrates a procedure to obtain points in the destination polygon corresponding to points in the source polygon.

FIG. 20 shows an example method for computing a correspondence relation for points other than the lattice points, from the corresponding point file. Since, in the corresponding point file, there is information on the lattice points only, data corresponding to interior points of each polygon need to be computed separately. FIG. 20 shows correspondence between a triangle ABC (which corresponds to a lower half of the source polygon R1 shown in FIG. 19) and a triangle A'B° C'(which corresponds to a lower half of the destination polygon R2 shown in FIG. 19). Now, for an interior point Q of triangle ABC, an intersection point of a line segment AC and an extended line of BQ to AC through the interior point Q interior-divides-the line segment AC in the ratio t:(1−t), and the point Q interior-divides a line segment connecting the AC interior-dividing point and a point B in the ratio s:(1−s). Similarly, for an corresponding point Q' of triangle A'B°C', an intersection point of a line segment A'C' and an extended line of B'Q' to the A'C' through the corresponding point Q', which corresponds to the point Q, interior-divides the line segment A'C', in the ratio t:(1−t), and the point Q' interior-divides a line segment connecting the A'C' interior-dividing point and a point B' corresponding to B in the ratio s:(1−s). Namely, it is preferable that the source polygon is divided into triangles, and interior points of the destination polygon are determined by using interior division of the vectors concerning the triangle. When expressed in a vector skew field, this becomes $$BQ=(1-s)\{(1-t)BA+tBC\},$$

thus, we have $$B'Q'=(1-s)\{(1-t)B'A'+tB'C'\}$$

Of course, similar processing will also be performed on a triangle ACD which is an upper half of the source polygon R1 shown in FIG. 19 and a triangle A'C'D' which is an upper half of the destination polygon R2.

Figure 21:
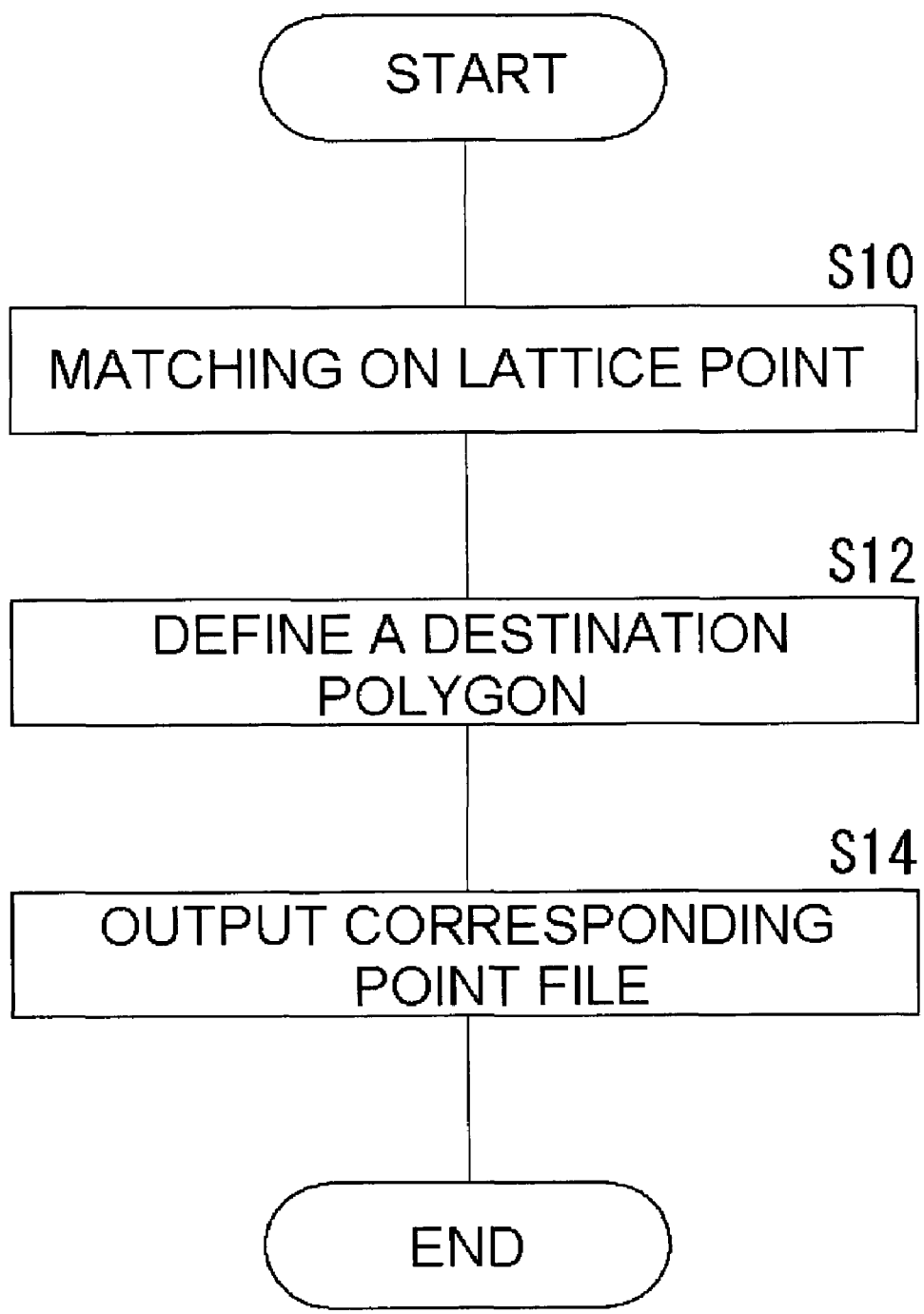
FIG. 21 is a flowchart showing a procedure for generating a corresponding point file.

FIG. 21 shows a flowchart of the encoding procedure described above. Firstly, as shown in FIG. 19, the matching results on the lattice points taken on the first image I1 are acquired (S10). In the matching, it is preferable that pixel-by-pixel matching according to the base technology is performed, so that a portion corresponding to the lattice points is extracted from those results. It is to be noted that the matching results on the lattice points may alternatively be specified based on other matching techniques, such as optical flow and block matching or the like, instead of using the base technology.

Thereafter, a destination polygon is defined on the second image I2 (S12), as shown in the right-hand side of FIG. 19. Since the above procedure completes generation of the corresponding point file, data by which to identify the first image I1 and the second image I2 are incorporated to this corresponding point file and the corresponding point file is output (S14). The two images and the corresponding point file may then be stored in a recording device or medium or may be transmitted directly via a network or via broadcast.

Figure 22:
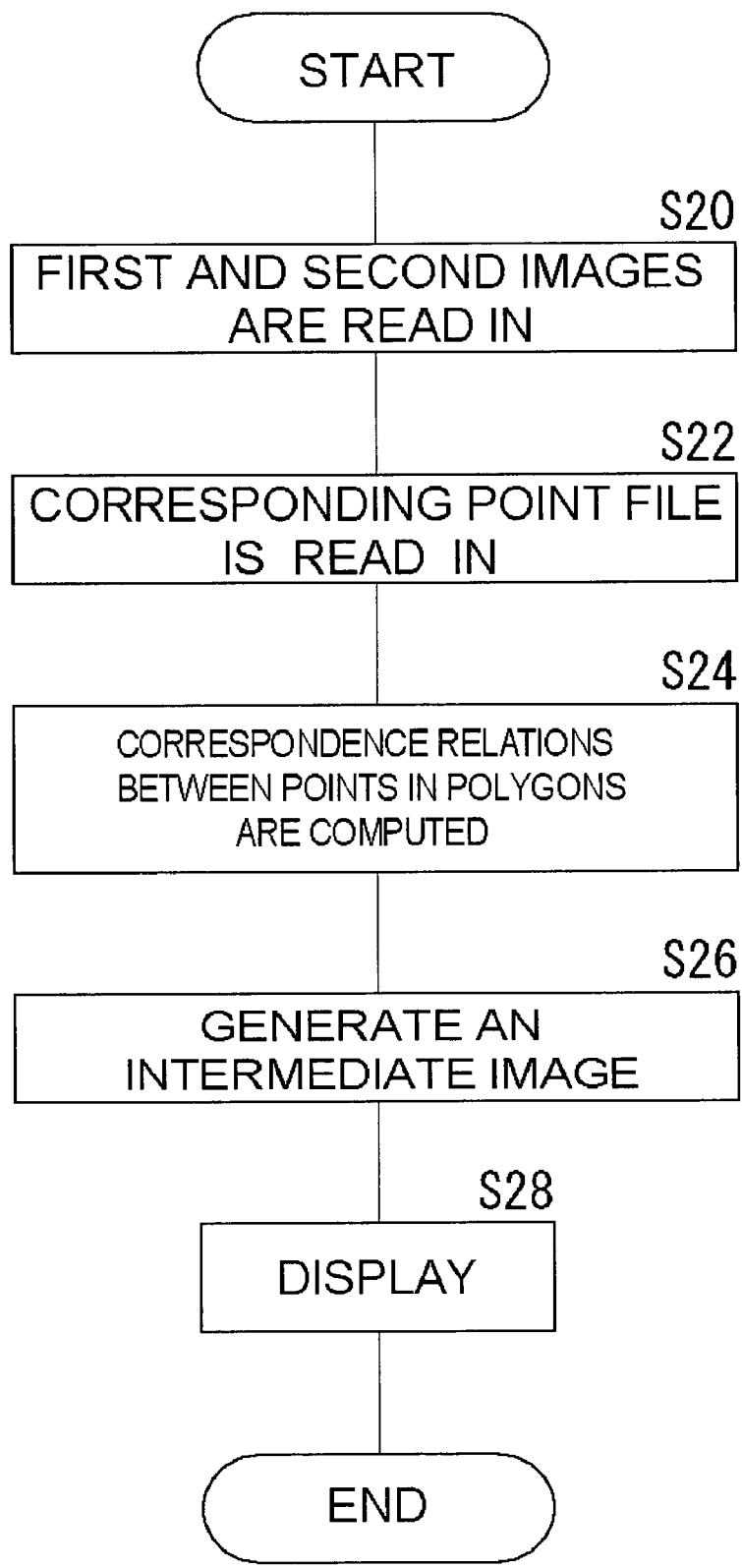
FIG. 22 is a flowchart showing a procedure for generating an intermediate image based on the corresponding point file.

FIG. 22 shows a flowchart of a procedure to generate an intermediate image or images by using the corresponding point file. Firstly, the first image I1 and the second image I2 are read in (S20), and then the corresponding point file is read in (S22). Thereafter, a correspondence relation between points in the source polygons and those of the destination polygons is computed by a method such as that shown in FIG. 20 (S24). At this time, the correspondence relation for all pixels within each image can be acquired. As described in the base technology, the coordinates and colors of points corresponding to each other can be interior-divided in the ratio u:(1−u), so that an intermediate image in a position which interior-divides temporally (for example) in the ratio (1−u):u between the first image I1 and the second image I2 can be generated (S26). It is to be noted that both interpolation and extrapolation may be performed.

Figure 23:
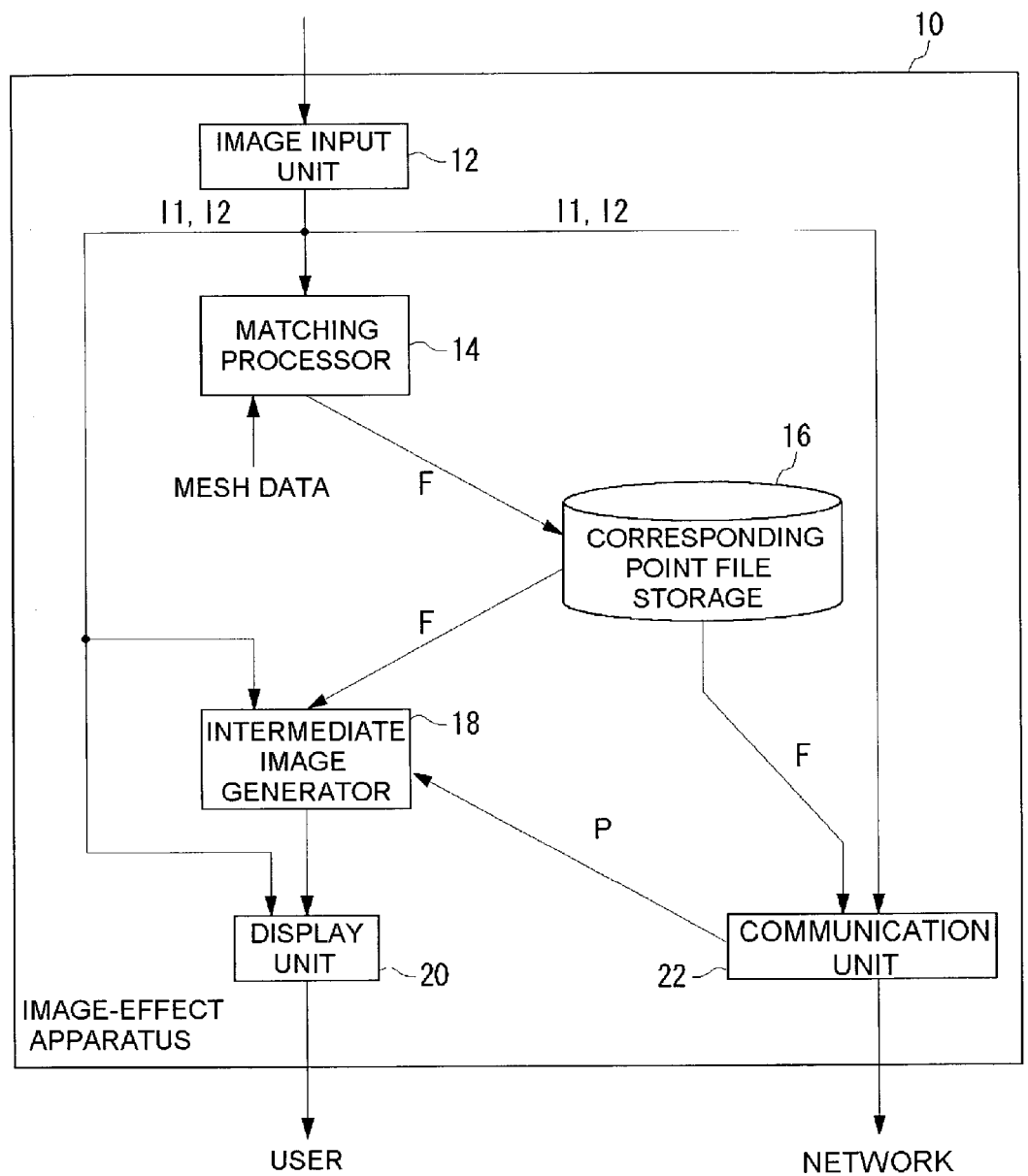
FIG. 23 shows an image processing apparatus according to an embodiment of the invention.

FIG. 23 shows a structure of an image processing apparatus 10 which performs the above-described procedure. The image processing apparatus 10 includes: an image input unit 12 which acquires the first image I1 and second image I2 from an external storage device, a photographing camera or the like; a matching processor 14 which performs a matching computation on these images using the base technology or other techniques; a corresponding point file storage unit 16 which stores the corresponding point file F generated by the matching processor 14; an intermediate image generator 18 which generates an intermediate image from the first image I1 and the second image I2 and the corresponding point file F; and a display unit 20 which displays the first image I1, second image and intermediate image as a series of images similar to the original motion picture by adjusting the timing of display. Moreover, a communication unit 22 may send out the first image I1, second image I2 and corresponding point file F to a transmission infrastructure such as a network or the like according to a request from an external unit (not shown). In FIG. 23, it is to be noted that mesh data, which indicate the size of the mesh, the positions of the lattice points and so forth, may be input in the matching processor 14. The mesh data may be preset for various resolution levels may be input by a user, or the like.

The apparatus 10 shown in FIG. 23 is illustrated in a manner such that a coding side (coding elements) and a decoding side (decoding elements) thereof are integrated into a single unit. In particular, the coding side is comprised generally of elements from the image input unit 12 up to the corresponding point file storage unit 16 while the decoding side is comprised generally of elements from the corresponding point file storage unit 16 up to the display unit 20. It will be understood that the coding elements and the decoding elements may be included in separate apparatuses as appropriate.

By implementing the above-described structure, encoding proceeds as follows. The first image I1 and the second image I2 are input to the image input unit 12 and are sent to the matching processor 14. The matching processor 14 performs a pixel-by-pixel matching computation between the images. The matching processor 14 then generates the corresponding point file F based on the mesh data and the thus generated corresponding point file F is output to the corresponding point file storage unit 16.

In decoding, the intermediate image generator 18 reads out the corresponding point file F upon request from a user or due to other factors, and generates an intermediate image or images. This intermediate image is sent to the display unit 20, where time adjustment of image output is performed so that motion pictures or morphing images are displayed.

As evident from the operations, the intermediate image generator 18 and the display unit 20 may be provided in a remote terminal (not shown) which is separate from the apparatus 10, and in such a case the remote terminal can receive a relatively low volume of data comprised of the first image I1, second image I2 and corresponding point file F and can independently reproduce motion pictures.

The communication unit 22 is provided on the assumption that may be a remote terminal via a network or the like which will receive data. Namely, the communication unit 22 may transmit or send out the first image I1, second image I2 and corresponding point file F via the network or via broadcast, so that motion pictures can be displayed at the remote terminal. Of course, the remote terminal may also be provided for the purpose of storage instead of display. The apparatus 10 may also be used in a manner such that the first image I1, the second image I2 and the corresponding point file F therefor are input from an external source such as a network or the like via the communication unit 22, and these are transferred to the intermediate image generator 18 where the interpolation is computed so as to generate intermediate images. A data path P therefor is indicated in FIG. 23.

An actual experiment was carried out according to the process of the first embodiment. In the experiment, images of approximately 256×256 pixels were adopted as the first image and second image, and the lattice points were set at intervals of 10 to some tens of pixels in the vertical and horizontal directions. In this experiment, a satisfactory morphing and satisfactory motion picture compression effect was obtained. In particular, the size of the corresponding point file F was approximately some kilobytes to 10 kilobytes, and it was confirmed that high image quality and a low volume of data could be achieved.

Second Embodiment

A second embodiment, deals with a problem of erroneous correspondence at the time of generation of the intermediate image. Initially, suppose that there are two key frames captured or photographed by a camera. If the two field-of-view spaces of the camera coincide, the generated intermediate image or images will be almost natural. However, when the camera pans (namely, changes the viewing direction) or the camera zooms in or out (namely, changes magnification while the viewing direction is kept intact), there will be points that are captured in one of the two key frames but that are not in the other key frame. Such points will be called "correspondence incapable points" hereinafter. As described above, a "correspondence incapable point" appears, for example, when a surrounding landscape is photographed panoramically while rotating the camera or when a distance view is magnified by zooming in the camera, and so forth.

In order to solve the possible mismatching problem caused by correspondence incapable points, according to the second embodiment, an edge portion of the intermediate image is cut out in order that the correspondence incapable points will not cause erroneous correspondence and the intermediate image will thus not appear unnatural. By the same token, a frame provided for adjusting the image size may be cut out in a similar manner.

Figure 24:
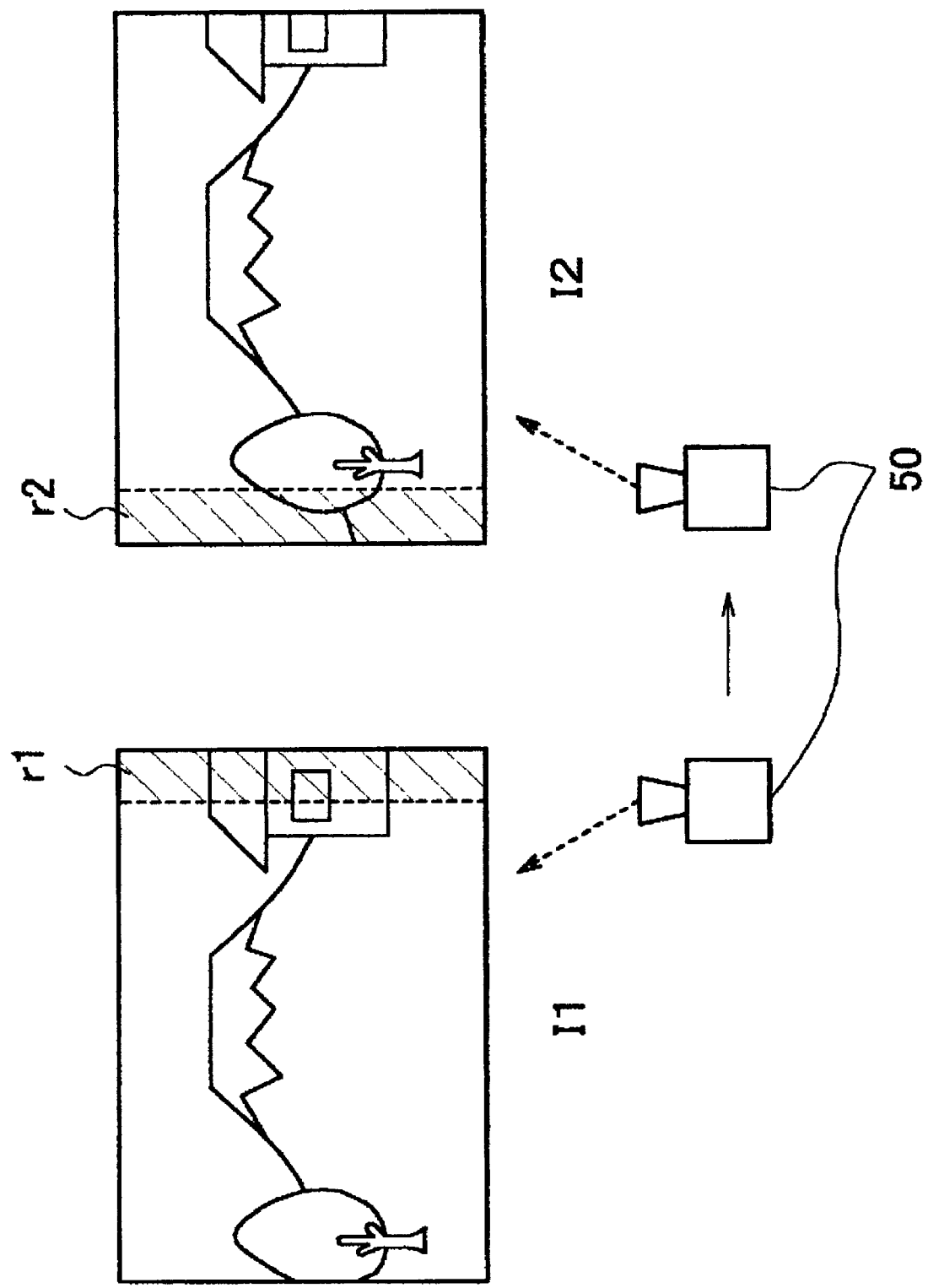
FIG. 24 illustrates one reason why an invalidated region is formed.

FIG. 24 illustrates an example of how correspondence incapable points (or an invalidated region) appear. In FIG. 24, suppose that a camera 50 moves to the right from a point where a first key frame I1 was shot prior to shooting a second key frame I2, or, similarly the camera 50 photographs a second key frame I2 after changing the visual line to the right. In this case, at the right edge of the first key frame I1 there is a strip-shaped region r1 made up of correspondence incapable points, and likewise there is a strip-shaped region r2 at the left edge of the second key frame I2. Thus, referring to FIG. 25, in this case, the two regions r1 and r2 are regarded as a region IVR (hereinafter also simply referred to as an "invalidated region") which may be invalidated, and will be cut out at the time of display.

Figure 26:
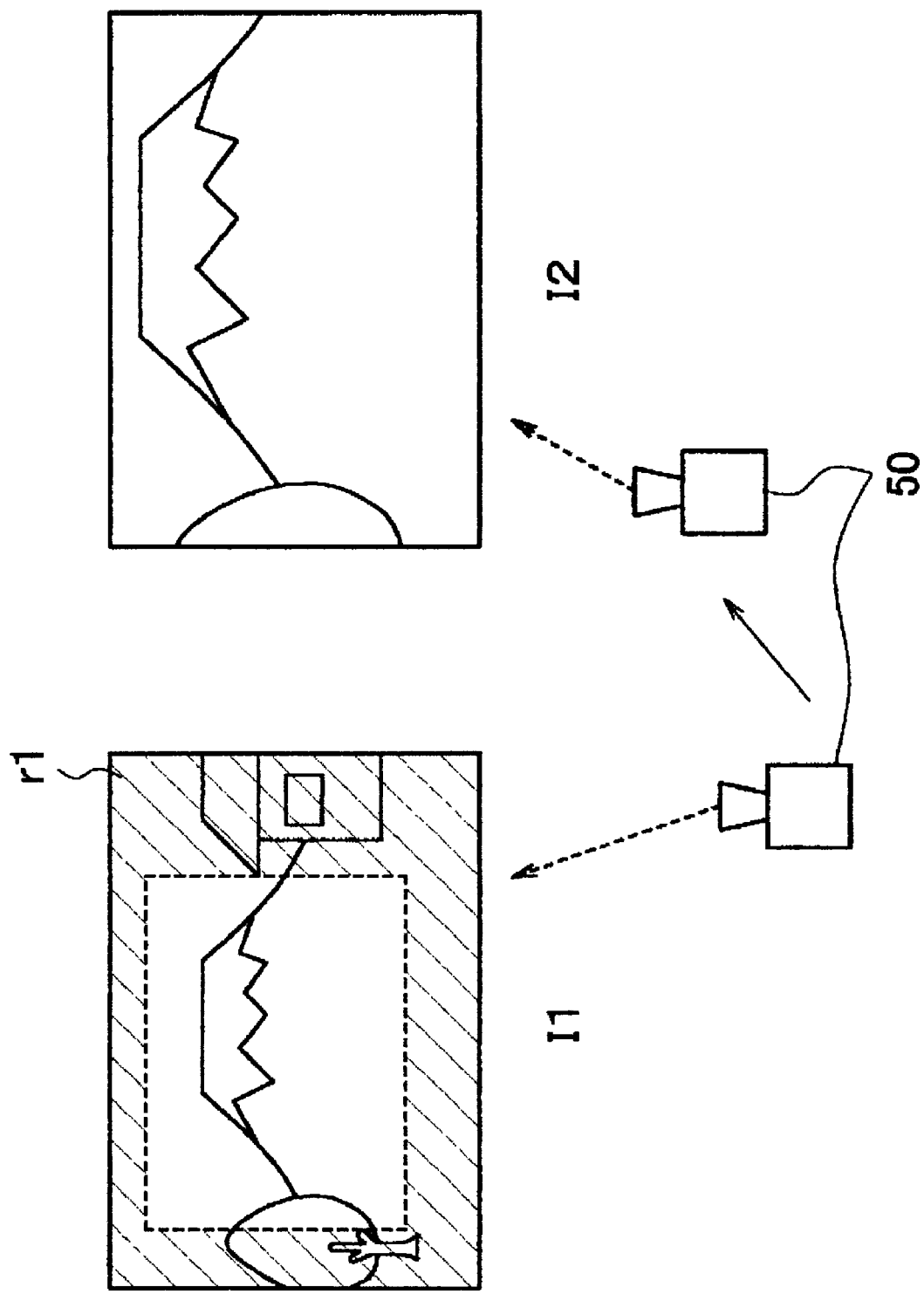
FIG. 26 illustrates another reason why an invalidated region is formed.
Figure 27:
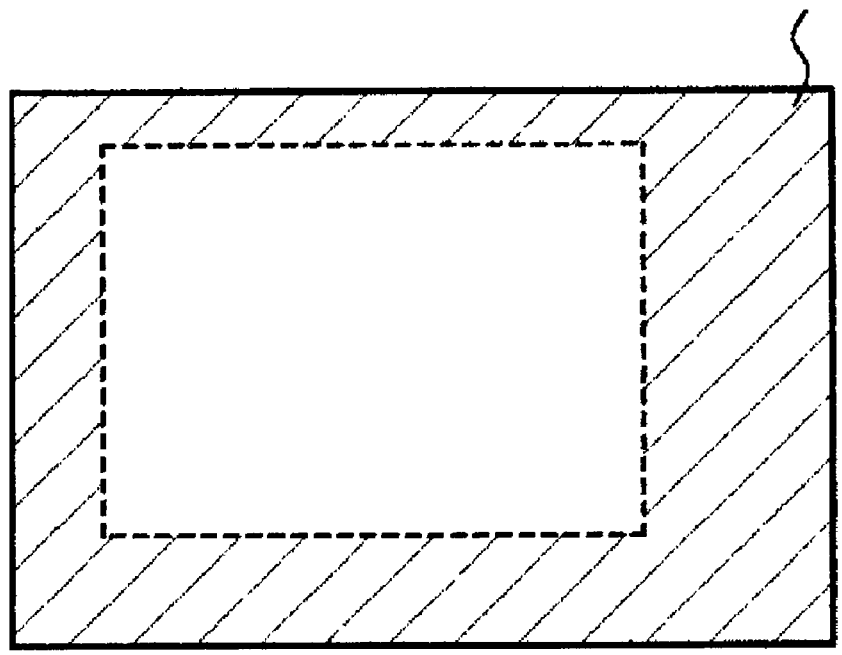
FIG. 27 shows an invalidated region IVR of the images shown in FIG. 26.

FIG. 26 illustrates another example of how correspondence incapable points appear. In FIG. 26, suppose that the camera 50 moves closer to a subject from a position where the camera 50 captured the first key frame I1 prior to capturing the second image I2, or, similarity the camera 50 captures the second key frame I2 after raising the magnification. Then, in the first key frame I1, there is a region r1 around the whole periphery made up of correspondence incapable points. Thus, as shown in FIG. 27, this region r1 may be designated as the invalidated region IVR and cut out at the time of display.

The image region excluding the above-described invalidated region (this image region being also referred to as a "remaining region") is useful in the sense that the remaining region is, in this example, rectangular, which is similar to the original image and makes subsequent processing simpler. For example, if a display system is 800×600 pixel resolution, then, it is desirable that the size of the key frame be set in advance to be a bit larger than 800×600, e.g., 1000×800, so that the remaining region (after removal of an invalidated region IVR) may be adjusted to the size of 800×600.

As described above, the invalidated region occurs when, for example, a camera which photographed key frames pans (namely, changes the viewing direction itself) or the camera zooms in and out (namely, magnification or reduction in the same radial direction). In these cases, there are pixels which do not correspond between the key frames, thus causing erroneous correspondence in the matching process. This erroneous correspondence will generally occur at the edges of the images. As described above, this is because points which are in one of the two frames but are excluded from the field of view in the other key frame occur mainly at the edge. Thus, the invalidated region can often be considered as a strip-shaped region surrounding the edge of the image somewhat like a picture frame or a part thereof. The cutting off of the invalidated region IVR be said to be the image trimming in the sense that the edge is thrown away.

Figure 25:
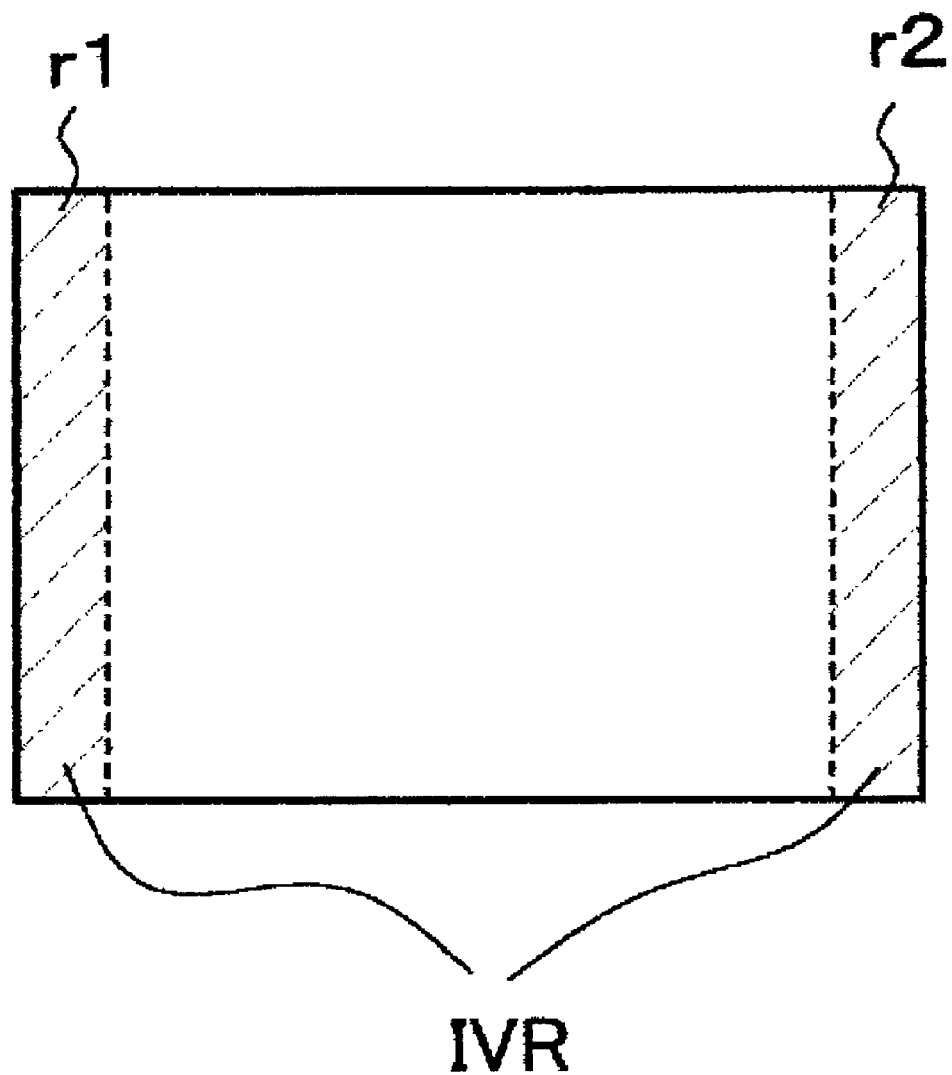
FIG. 25 shows an invalidated region IVR for the images shown in FIG. 24.
Figure 28:
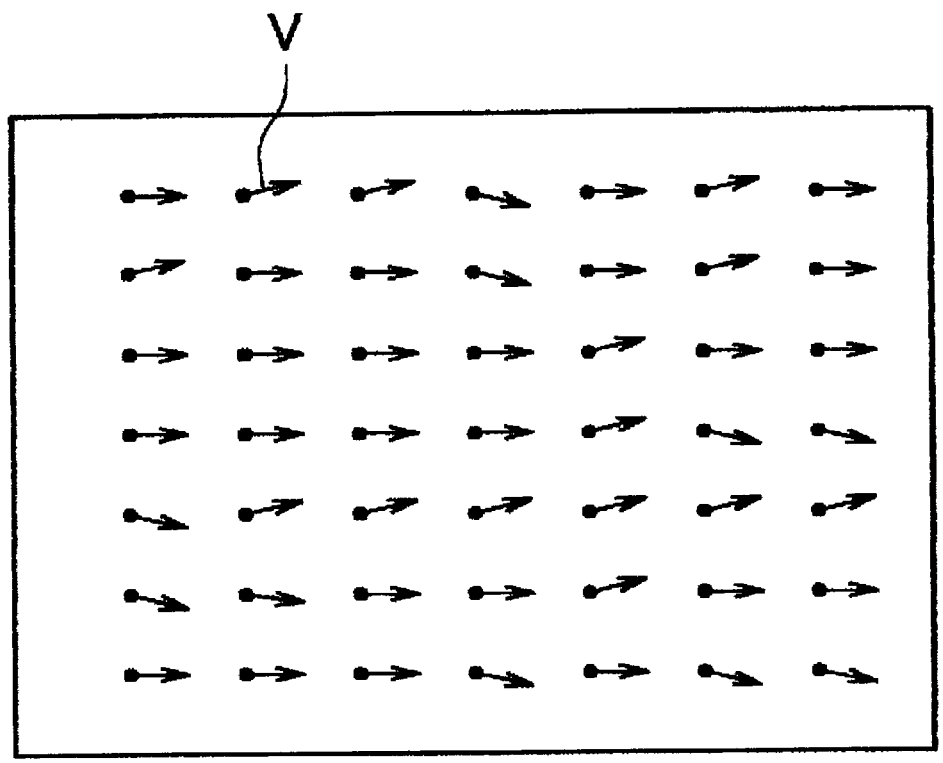
FIG. 28 shows an example of motion vectors analyzed in a judging unit according to an embodiment of the invention.

Referring to FIG. 23, when the corresponding point file F is generated at the matching processor 14, motion vectors between the corresponding points can be detected so as to determine the invalidated region. In the case shown in FIG. 24, each pixel of the first key frame I1 is somewhat "shifted" to the right in the second key frame I2. Thus; it is easy to understand that an invalidated region IVR as shown in FIG. 25 is determined in this case. The width of the invalidated region IVR can be made proportional to the magnitude of the motion vector v. To determine whether or not the motion vectors v are aligned pointing to the right as shown in FIG. 28, one example method is to assume a vector to the right for each point and then take a summation of the difference between the assumed vectors and the actual vectors, so that it can be determined based on whether or not the magnitude of the difference is less than a predetermined threshold value. As another method, presume in advance that there is a variation of the field of view between the key frames in a plurality of ways and then make those motion vectors v into a template, so that the motion of the camera may be specified by so-called "template matching". It will be understood that the invalidated region IVR or an approximation thereof can be determined by one of these methods or by other methods that are known or become know to one of skill in the art.

Further, it is noted that the motion vector v may be referred to not in the whole image but, instead, in the peripheral portion of the image as a major region of interest. Conversely, the vicinity of the center of the image may also be referred to. The former is meaningful in the sense of utilization of locality, however, it may provide a reverse effect if a point included in the invalidated region IVR is referred to.

In a case where the motion vectors are aligned in the upper right direction, the invalidated region IVR may be provided all around the image as shown in FIG. 27. The width of the invalidated region IVR in the top and bottom sides as well as the left and right sides of the image can be made proportional to the longitudinal and transverse directional components of the respective motion vectors.

Figure 29:
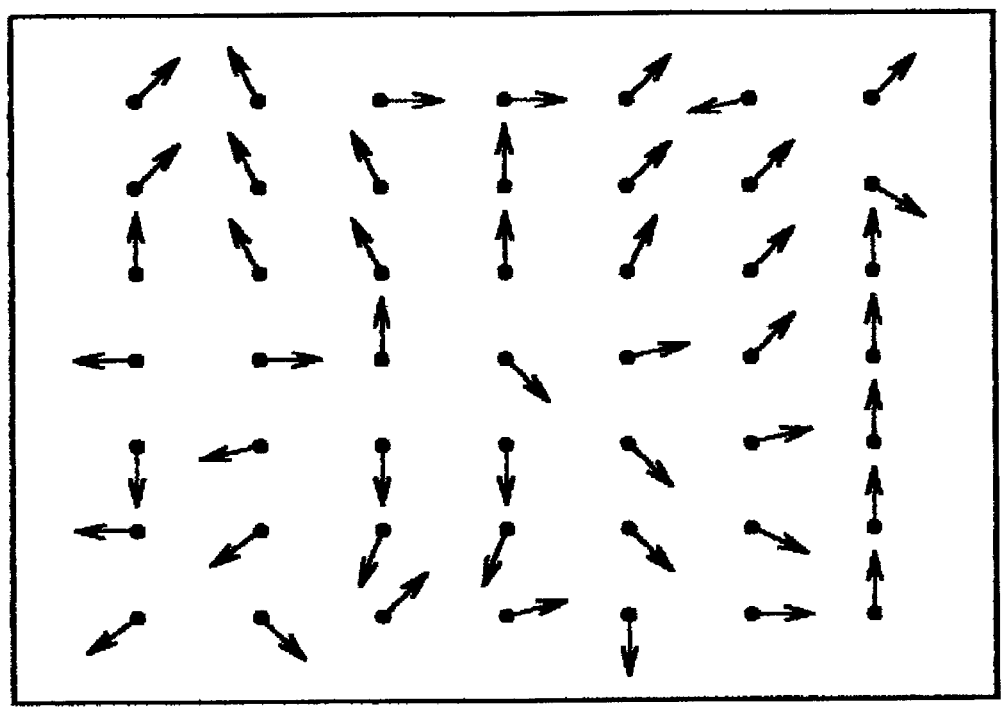
FIG. 29 shows another example of motion vectors analyzed in the judging unit.

FIG. 29 schematically shows the motion vectors v for the case shown in FIG. 26. In this case, the motion vectors v are uniformly directed in the direction where the image is magnified on the whole starting from the center and its neighborhood. However, since the peripheral portion of the image is included in the invalidated region IVR, an erroneous correspondence is caused there and improper motion vectors v are obtained in this region. If the invalidated region IVR is rather large, namely, when the variation of the field of view between the key frames is large, it will be indicated because a remaining region of the motion vectors v will be narrowed down to the close neighborhood of the center thereof. It is preferable that, in the case shown in FIG. 29, the invalidated region IVR be determined in a similar way as described above, by template matching, or other methods known in the art including statistical processing such as variance computation or the like.

It is to be noted that the above-described determination of the invalidated region may be carried out at the coding side or decoding side. If carried out at the coding side, information on the invalidated region may be incorporated into a coded data stream in the following manner.

1. The information on the invalidated region may be included as added information accompanying the corresponding point file F, where the added information may include the coordinates of the invalidated region and a processing method for handling the invalidated region. As a processing method, there are a variety of possible cases, for example, where the invalidated region is cut out and the frames are displayed accordingly, or where the invalidated region is filled with a background color, for example, black, and the frames are displayed accordingly, and so forth. In the former case, since the effective display region is reduced, it may be determined in advance that frames having a lower resolution (or pixels whose number is less than the key frame) are displayed at the decoding side. Further, the size of the key frame may be set in advance to be larger so that a large effective display region may be provided even after the trimming. In the latter case, besides specifying any specific color, texture data and other image data may be stored in the coded data stream, so that the decoding side may explicitly or implicitly be instructed to replace the invalidated region with this image data. Moreover, within the corresponding point file F, correspondence information regarding points included in the invalidated region IVR may be deleted, so that the decoding side can detect the position and shape of the invalidated region, based on the fact that "there is no data." The above processing methods, including the deletion of the correspondence data, may be similarly effective in the following #2–#4 where appropriate.
2. The above-described added information may be described in/included within the corresponding point file F. Namely, the format of the corresponding point file F may be changed to accommodate the information on the invalidated region.
3. Instead of utilizing the added information, the image data for the invalidated region IVR may be cut out and a key frame of somewhat smaller size may be generated, so that this key frame is incorporated into the coded data stream.
4. In a case where the variation of the field of view is small and thus trimming is not required, such a fact may be positively incorporated into the coded data stream or no action may be taken.

The above description deals with the coding side. As long as there is a predetermined arrangement made between the decoding side and the coding side, after a necessary trimming process or the like is carried out, the image can be reproduced at the decoding side. Now, example decoding-side processing which corresponds to the above #1–#4 are described in the following #1a–#4a.

1a. The coded data streams are input and the added information is detected. If an invalidated region and its processing method are described in the added information, the image is trimmed and reproduced according to the invalidated region and its processing method.
2a. The above-described added information is detected inside the corresponding point file F.
3a. Key frames included in the coded data stream are reproduced and displayed according to the size of each key frame.
4a. If "no trimming required" is indicated or if there is no added information or the like, the image is reproduced in a normal manner.

In any case, there will generally be an arrangement by the decoding side with the coding side, in advance, as to the location, format and so forth of the added information. Even if there is no arrangement, the location, format and so forth of the added information can be dealt with to a certain degree by inspecting the coded data stream at the decoding side. For example, if there is added information included in the coded data stream, it will be utilized; if it is not included, the correspondence information which has been deleted in the corresponding point file may be detected, thereby enabling the trimming to be performed because the invalidated region is recognized by itself. Moreover, if deleted corresponding point information is not detected, the image will be reproduced in full size. However, the decoding side may also determine the invalidated region by itself by detecting the motion vectors in the same manner as in the coding side, so that the trimming may be carried out.

In the above, if the key frame is made smaller due to the trimming, it is preferable that the intermediate frame also be made smaller by the same trimming.

Figure 30:
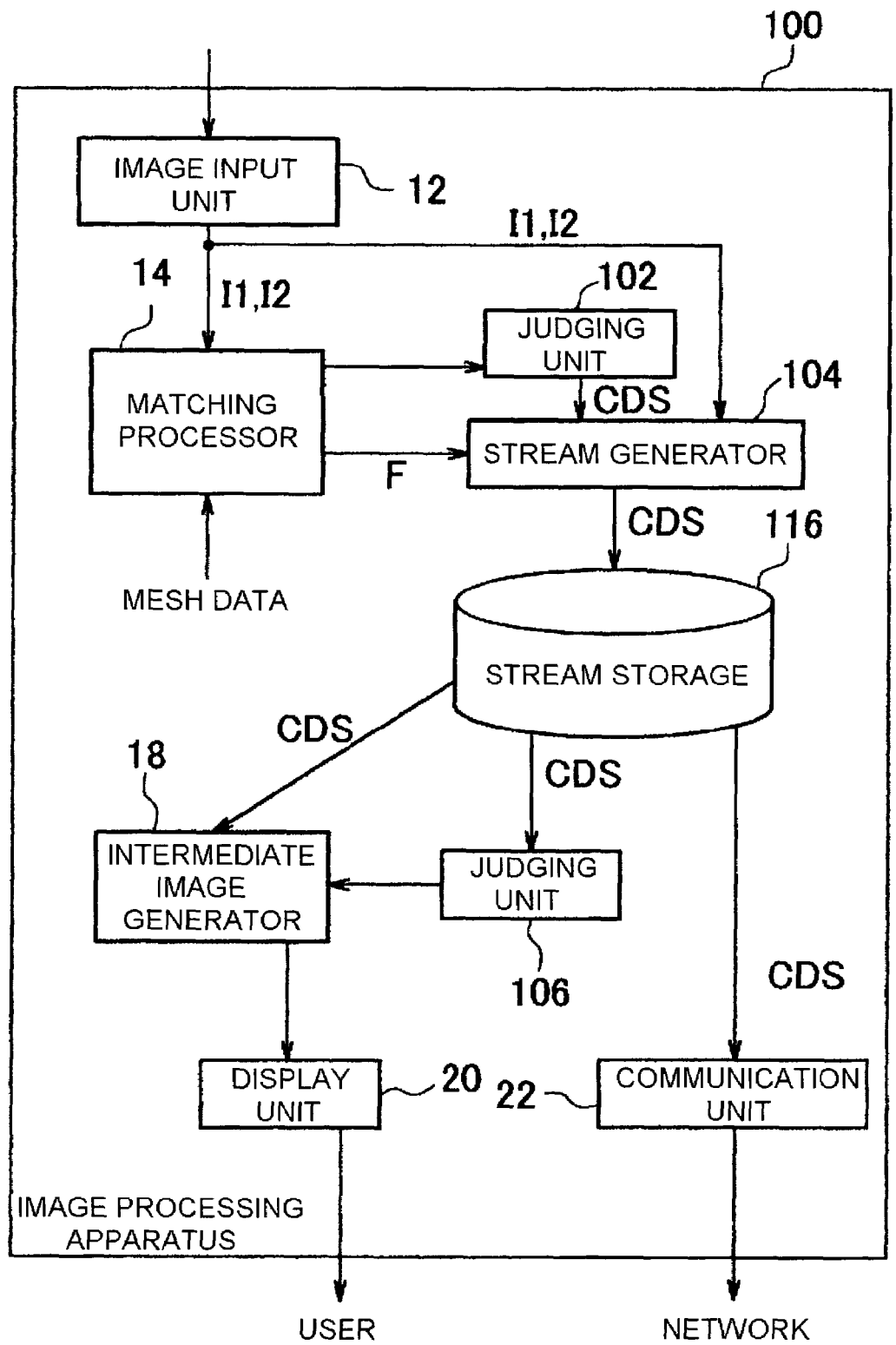
FIG. 30 shows an image processing apparatus according to another embodiment of the invention.

FIG. 30 is a schematic diagram of an image processing apparatus 100 according to an embodiment of the invention. In FIG. 30, the same reference numerals are used for similar components shown in FIG. 23 and the following description will focus on components that are different.

A judging unit 102 at the coding side detects motion vectors by a method such as those described above. When it is judged or determined that the variation of the field of view of a camera is sufficiently large (for example, beyond a predetermined threshold), an invalidated region is determined and added information is effectively generated. The thus generated added information is sent to a stream generator 104. On the other hand, when it is judged or determined that the variation of the field of view is not sufficiently large, no added information may be generated, or a message to the effect that "no trimming is necessary" may be actively indicated. Alternatively, even if the variation of the field of view is sufficiently large, the invalidated region may simply be determined without generating the added information, namely, coordinate information necessary for defining the shape of the invalidated region or the like may be sent or notified to the stream generator 104.

When there is added information, the stream generator 104 incorporates the added information or data together with the data of the first and second images I1 and I2 and the corresponding point file F and then generates a coded data stream CDS and stores this CDS in a stream storage unit 116. On the other hand, when there is no added information and the variation of the field of view is large, the data stream generator 104 deletes the corresponding point information based on the co-ordinate information defining the shape of the invalidated region or the like, and/or trims down the key frame and incorporates this trimmed key frame into the coded data stream CDS. In the case where there is no added information because the variation of the field of view is small, there is no need to take any steps, however, information to the effect that "no trimming is necessary" may be actively incorporated into the coded data stream CDS. Unlike the first embodiment, in this embodiment, the data of the key frames and the corresponding point file F are integrated in the coded data stream CDS, so that there is not a separate path through which the data of the key frames are separately sent to a communication unit 22, intermediate generator 18 and display unit 20.

Next, the structure of the decoding side is described. A judging unit 106 at the decoding side is an optional component, and this optional judging unit 106 is generally not necessary if there is a judging unit 102 at the coding side. As an example, suppose there is not a judging unit 102 at the coding side. In this case, the judging unit 106 at the decoding side first acquires the corresponding point file F or the coded data stream CDS which incorporates this corresponding point file F and defines the invalidated region similar to the judging unit 102 described above, for example, when the magnitude of the variation of the field of view of a camera exceeds a predetermined threshold value, and then notifies this to the intermediate image generator 18.

In addition to the process defined in the first embodiment above, the intermediate image generator 18 may also cut out the invalidated region which is included in the coded data stream CDS or which is notified from the judging unit 106. Alternatively, the intermediate image generator 18 may fill up the invalidated region with a predetermined color or texture when generating an intermediate image. In this case, the intermediate image generator 18 may extract image data by which to replace the data of the invalidated region from the coded data stream CDS if such image data exists in the coded data stream CDS. Similar to the description above, the intermediate image together with the key frames are displayed as motion pictures in the display unit 20.

The above describes the coding and the decoding of the image according to this second embodiment. In this second embodiment, there are various modifications and varied techniques that can be made in similar manner to the variations and modifications described in Japanese Patent Application No. 2001-21098 which are hereby incorporated by reference herein. It will be understood that the base technology may be used or may not be used for performing the matching in the second embodiment.

Although in the above description the invalidated region is determined in various ways it may also be fixed in advance or set by a user or the like. In such a case, the decoding side may simply cut out this fixed invalidated region every time so as to display accordingly.

Although the present invention has been described by way of exemplary embodiments, it should be understood that many changes and substitutions may be made by those skilled in the art without departing from the scope of the present invention which is defined by the appended claims.

What is claimed is:

1. An image coding method, comprising:
    detecting corresponding point data between key frames by image matching;
    determining added information by which to invalidate at least a region of a reproduction image which is to be generated at a decoding side based on the corresponding point data; and
    generating a coded data stream incorporating the corresponding point data and added information.

2. An image coding method according to claim 1, wherein the added information includes indication of a region to be invalidated.

3. An image coding method according to claim 1, wherein the added information includes image data by which to replace data of a region to be invalidated.

4. An image coding method according to claim 1, wherein the corresponding point data are incorporated into the coded data stream after data which correspond to a region to be invalidated are deleted from the corresponding point data.

5. An image coding method according to claim 1, wherein the key frames are photographed by a camera, the method further comprising:
    judging the magnitude of variation of field of view of the camera which photographed the key frames, based on the corresponding point data,
    wherein the added information is effectively generated or effectively incorporated only when it is judged that the variation of the field of view is substantially large.

6. An image coding method according to claim 1, wherein the image matching is computed in a manner such that critical points are extracted in each key frame and thereby correspondence of the critical points between the key frames is evaluated.

7. An image coding method, comprising:
    detecting corresponding point data between key frames by image matching; and
    incorporating data of the key frames having at least a region that is invalidated, and the detected corresponding point data, so as to generate a coded data stream.

8. An image coding method according to claim 7, wherein the corresponding point data are incorporated into the coded data stream in a form such that data which correspond to the invalidated region are deleted from the corresponding point data.

9. An image coding method according to claim 7, wherein the key frames are photographed by a camera, the method further comprising:
    judging the magnitude of variation of field of view of the camera which photographed the key frames, based on the detected corresponding point data,
    wherein the region is invalidated only when it is judged that the variation of the field of view is substantially large.

10. An image coding method according to claim 7, wherein the image matching is computed in a manner such that critical points are extracted in each key frame and thereby correspondence of the critical points between the key frames is evaluated.

11. An image coding method, comprising:
    detecting corresponding point data between key frames by image matching;
    determining added information by which to invalidate at least a region of a reproduction image which is to be generated at a decoding side based on the detected corresponding point data, and incorporating the added information into the corresponding point data; and
    generating a coded data stream comprising the corresponding point data.

12. An image coding method according to claim 11, wherein the added information includes indication of a region to be invalidated.

13. An image coding method according to claim 11, wherein the added information includes image data by which to replace data of a region to be invalidated.

14. An image coding method according to claim 11, wherein the corresponding point data are incorporated into the coded data stream after data which correspond to a region to be invalidated are deleted from the corresponding point data.

15. An image coding method according to claim 11, wherein the key frames are photographed by a camera, the method further comprising:

judging the magnitude of movement of viewpoint of the camera which photographed the key frames, based on the detected corresponding point data, wherein the added information is effectively generated only when it is judged that the movement of the viewpoint is substantially large.

16. An image coding method according to claim 11, wherein the image matching is computed in a manner such that a critical point is extracted from each key frame and thereby correspondence of the points between the key frames is evaluated.

17. An image coding method, comprising:
generating a coded data stream incorporating corresponding point data between key frames and added information by which to invalidate at least a region of an intermediate image which is to be generated at a decoding side based on the corresponding point data.

18. An image coding method according to claim 17, wherein a region to be invalidated includes left and right edges of the frames when motion vectors between corresponding points of the key frames are aligned approximately in one direction parallel to the top or bottom side of the frames.

19. An image coding method according to claim 18, wherein the width of the region to be invalidated is proportional to the magnitude of the motion vectors.

20. An image coding method according to claim 18, wherein whether or not the motion vectors are aligned approximately in one direction parallel to the top or bottom side of the frames is detected in a manner such that vectors in one direction are assumed and then the sum of differences between the assumed vectors and actual vectors are taken to determine whether or not the sum is less than a predetermined threshold value.

21. An image coding method according to claim 17, wherein a variation of the field of view between the key frames is presumed in advance for a plurality of directions and motion vectors between corresponding points of the key frames are made into a template, so that motion of a camera that photographed the key frames is specified and a region to be invalidated is determined.

22. An image coding method according to claim 17, wherein a region to be invalidated is provided all around an image when motion vectors between corresponding points of the key frames are aligned approximately in an upper right direction.

23. An image coding method according to claim 22, wherein the width of the region to be invalidated in top and bottom sides as well as left and right sides of the image is proportional to longitudinal and transverse directional components of the respective motion vector.

24. An image coding method according to claim 17, wherein a reference region of motion vectors between corresponding points of the key frames is narrowed down to a close vicinity of the center of key frames when variation of the field of view between the key frames is substantially large.

25. An image coding method, including:
incorporating corresponding point data between key frames and data of key frames having at least a region that is invalidated, so as to generate a coded data stream.

26. An image coding method according to claim 25, wherein an invalidated region includes left and right edges of the frames when motion vectors between corresponding points of the key frames are aligned approximately in one direction parallel to the top or bottom side of the frames.

27. An image coding method according to claim 26, wherein the width of the invalidated region is proportional to the magnitude of the motion vectors.

28. An image coding method according to claim 26, wherein whether or not the motion vectors are aligned approximately in one direction parallel to the top or bottom side of the frames is detected in a manner such that vectors in one direction are assumed and then the sum of differences between the assumed vectors and actual vectors are taken to determine whether or not the sum is less than a predetermined threshold value.

29. An image coding method according to claim 25, wherein a variation of the field of view between the key frames is presumed in advance for a plurality of ways and motion vectors between corresponding points of the key frames are made into a template, so that motion of a camera that photographed the key frames is specified and a region to be invalidated is determined.

30. An image coding method according to claim 25, wherein an invalidated region is provided all around an image when motion vectors between corresponding points of the key frames are aligned approximately in an upper right direction.

31. An image coding method according to claim 30, wherein the width of the invalidated region in top and bottom sides as well as left and right sides of the image is proportional to longitudinal and transverse directional components of the respective motion vector.

32. An image coding method according to claim 25, wherein a reference region of motion vectors between corresponding points of the key frames is narrowed down to a close vicinity of the key frames when variation of the field of view between the key frames is substantially large.

33. An image coding method, including:
incorporating added information by which to invalidate at least part of region of a reproduction image which is to be generated at a decoding side based on corresponding point data between key frames, into the corresponding point data, so as to generate a coded data stream.

34. An image coding method according to claim 33, wherein a region to be invalidated includes left and right edges of the frames when motion vectors between corresponding points of the key frames are aligned approximately in one direction parallel to the top or bottom side of the frames.

35. An image coding method according to claim 34, wherein the width of the region to be invalidated is made proportional to the magnitude of the motion vectors.

36. An image coding method according to claim 34, wherein whether or not the motion vectors are aligned approximately in one direction parallel to the top or bottom side of the frames is detected in a manner such that vectors of the one same direction are assumed and then the sum of difference between the assumed vectors and actual vectors are taken to determine whether or not the sum is less than a predetermined threshold value.

37. An image coding method according to claim 33, wherein variation of the field of view between the key frames are presumed in advance for a plurality of ways and motion vectors between corresponding points of the key frames are made into a template, so that motion of a camera that photographed the key frames is specified and a region to be invalidated is determined.

38. An image coding method according to claim 33, wherein a region to be invalidated is provided all around an image when motion vectors between corresponding points of the key frames are aligned approximately toward an upper right direction.

39. An image coding method according to claim 38, wherein the width of the region to be invalidated in top and bottom sides as well as left and right sides of the image is made proportional to longitudinal and transverse directional components of the respective motion vector.

40. An image coding method according to claim 33, wherein a reference region of motion vectors between corresponding points of the key frames is narrowed down to a close vicinity of the key frames when variation of the field of view between the key frames is substantially large.

41. An image coding apparatus, comprising:
a matching processor which detects corresponding point data by image matching; and
a stream generator which generates a coded data stream by incorporating the corresponding point data and added information by which to invalidate at least a region of a reproduction image which is to be generated at a decoding side based on the corresponding point data.

42. An image coding apparatus according to claim 41, wherein the added information includes indication of a region to be invalidated.

43. An image coding apparatus according to claim 41, wherein the added information includes image data by which to forcibly replace data of a region to be invalidated.

44. An image coding apparatus according to claim 41, wherein the corresponding point data are incorporated into the coded data stream after data which correspond to a region to be invalidated are deleted from the corresponding point data.

45. An image coding apparatus according to claim 41, wherein the key frames are photographed by a camera, the apparatus further comprising:
a judging unit which judges the magnitude of variation of field of view of the camera which photographed the key frames, based on the corresponding point data,
wherein the added information is effectively generated or effectively incorporated only when it is judged that the variation of the field of view is substantially large.

46. An image coding apparatus according to claim 41, wherein said matching processor evaluates correspondence of critical points between the key frames by extracting the critical point at each key frame.

47. An image coding apparatus, comprising:
a matching processor which detects corresponding point data between key frames by image matching; and
a stream generator which generates a coded data stream by incorporating data of the key frames having at least a region that is invalidated and the detected corresponding point data.

48. An image coding apparatus according to claim 47, wherein the corresponding point data are incorporated into the coded data stream in a form such that data which correspond to the invalidated region are deleted.

49. An image coding apparatus according to claim 47, wherein the key frames are photographed by a camera, the apparatus further comprising:
a judging unit which judges the magnitude of variation of field of view of the camera which photographed the key frames, based on the detected corresponding point data,
wherein the region is invalidated only when it is judged that the variation of the field of view is substantially large.

50. An image coding apparatus according to claim 47, wherein said matching processor evaluates correspondence of critical points between the key frames by extracting critical points from each key frame.

51. An image coding apparatus, comprising:
a matching processor which detects corresponding point data between key frames by image matching; and
a stream generator which generates a coded data stream by incorporating added information by which to invalidate at least part of a region of a reproduction image which is to be generated at a decoding side based on the detected corresponding point data, into the corresponding point data, so as to generate a coded data stream.

52. An image coding apparatus according to claim 51, wherein the added information includes indication of a region to be invalidated.

53. An image coding apparatus according to claim 51, wherein the added information includes image data by which to forcibly replace data of a region to be invalidated.

54. An image coding apparatus according to claim 51, wherein the corresponding point data are incorporated into the coded data stream after data which correspond to a region to be invalidated are deleted.

55. An image coding apparatus according to claim 51, wherein the key frames are photographed by a camera, the apparatus further comprising:
a judging unit which judges the magnitude of movement of viewpoint of the camera which photographed the key frames, based on the detected corresponding point data,
wherein the added information is effectively generated only when it is judged that the movement of the viewpoint is substantially large.

56. An image coding apparatus according to claim 51, wherein said matching processor evaluates correspondence of critical points between the key frames by extracting the critical point at each key frame.

57. An image coding apparatus, including:
a stream generator which generates a coded data stream by incorporating corresponding point data between key frames, and added information by which to invalidate at least part of region of an intermediate image which is to be generated at a decoding side based on the corresponding point data.

58. An image coding apparatus, including:
a stream generator which generates a coded data stream by incorporating corresponding point data between key frames, and data of key frames whose at least part of region is invalidated.

59. An image coding apparatus, including:
a stream generator which generates a coded data stream by incorporating added information by which to invalidate at least part of region of a reproduction image which is to be generated at a decoding side based on corresponding point data between key frames, into the corresponding point data.

60. An image decoding method, comprising:
acquiring a coded data stream of an image; and
generating an intermediate frame based on corresponding point data between key frames included in the acquired coded data stream,
wherein the intermediate frame is generated in a manner that at least part of region thereof is invalidated.

61. An image decoding method according to claim 60, wherein said generating is processed by extracting indication of a region to be invalidated, from the coded data stream.

62. An image decoding method according to claim 60, wherein said generating is processed by extracting image data which forcibly replaces data of a region to be invalidated, from the coded data stream.

63. An image decoding method according to claim 60, further comprising:

judging the magnitude of variation of field of view of a camera which photographed the key frames based on the corresponding point data, wherein said invalidating is executed only when it is judged that the variation of the field of view is substantially large.

64. An image decoding apparatus, comprising:

an image input unit which acquires a coded data stream of an image; and an intermediate image generator which generates an intermediate frame based on corresponding point data between key frames included in the acquired coded data stream, wherein said intermediate image generator generates the intermediate frame in a manner that at least part of region thereof is invalidated.

65. An image decoding apparatus according to claim 64, wherein said intermediate image generator extracts indication of a region to be invalidated, from the coded data stream.

66. An image decoding apparatus according to claim 64, wherein said intermediate image generator extracts image data which forcibly replaces data of a region to be invalidated, from the coded data stream.

67. An image decoding apparatus according to claim 64, further comprising:

a judging unit which judges the magnitude of variation of field of view of a camera which photographed the key frames based on the corresponding point data, wherein said invalidating is executed only when it is judged that the variation of the field of view is substantially large.

* * * * *